United States Patent
Vijay Marathe et al.

(10) Patent No.: US 8,600,007 B2
(45) Date of Patent: Dec. 3, 2013

(54) SYSTEMS, METHODS, AND COMPUTER READABLE MEDIA FOR PROVIDING TOLL-FREE SERVICE IN A TELECOMMUNICATIONS NETWORK

(75) Inventors: Rohini Vijay Marathe, Cary, NC (US); Devesh Agarwal, Raleigh, NC (US); Raghavendra Gopala Rao, Cary, NC (US); Peter Joseph Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 886 days.

(21) Appl. No.: 12/624,996

(22) Filed: Nov. 24, 2009

(65) Prior Publication Data

US 2010/0158201 A1    Jun. 24, 2010

Related U.S. Application Data

(60) Provisional application No. 61/117,545, filed on Nov. 24, 2008.

(51) Int. Cl.
- H04M 15/12 (2006.01)
- H04L 12/66 (2006.01)
- H04Q 3/00 (2006.01)
- G06Q 30/00 (2012.01)

(52) U.S. Cl.
USPC ............ 379/36; 370/218; 370/328; 370/352; 370/390; 379/88.13; 379/93.12; 379/201.02; 379/211.01; 379/221.14; 705/14.4; 707/999.202; 714/38.1

(58) Field of Classification Search
USPC ......... 379/36, 88.13, 114.24, 201.03, 218.01, 379/220.01, 221.08, 221.14, 93.01, 93.12, 379/201.02, 210.02, 211.01, 211.02, 219; 370/218, 328, 352, 390; 705/14.4; 707/999.202; 714/38.1
See application file for complete search history.

(56) References Cited

U.S. PATENT DOCUMENTS

| | | | |
|---|---|---|---|
| 4,191,860 A | | 3/1980 | Weber |
| 5,282,243 A | * | 1/1994 | Dabbaghi et al. ........ 379/210.02 |

(Continued)

FOREIGN PATENT DOCUMENTS

| CN | 200680017480.6 | 11/2011 |
|---|---|---|
| EP | 1 217 816 A1 | 6/2002 |

(Continued)

OTHER PUBLICATIONS

"How Vanity Toll Free Numbers Work," http://www.mytollfree800number.com/vanity-numbers-800-toll-free-service.cfm, (copyright 2009) (downloaded from the Internet on Dec. 29, 2009).

(Continued)

Primary Examiner — Gerald Gauthier
(74) Attorney, Agent, or Firm — Jenkins, Wilson, Taylor & Hunt, P.A.

(57) ABSTRACT

Methods, systems, and computer program products for providing toll-free service in a telecommunications network are disclosed. According to one aspect, the subject matter described herein includes a method for providing toll-free service in a telecommunications network. The method includes, at a signaling node that includes at least one processor: receiving a first signaling message that includes a toll-free called party number, where the first signaling message is one of a non-TCAP call setup message, a mobility management query, a number portability (NP) query, and an E.164 number (ENUM) query; determining a directory number associated with the toll-free called party number; and sending the first signaling message or a second signaling message, the sent message including at least one of the directory number and routing information associated with the directory number.

26 Claims, 24 Drawing Sheets

(56) References Cited

U.S. PATENT DOCUMENTS

| | | | |
|---|---|---|---|
| 5,425,090 A * | 6/1995 | Orriss | 379/221.08 |
| 5,475,746 A * | 12/1995 | Miller et al. | 379/201.03 |
| 5,550,909 A * | 8/1996 | Chanda et al. | 379/221.14 |
| 5,602,909 A | 2/1997 | Carkner et al. | |
| 6,069,946 A * | 5/2000 | Lieuwen | 379/211.01 |
| 6,289,095 B1 * | 9/2001 | Buttitta et al. | 379/220.01 |
| 6,320,952 B1 * | 11/2001 | Bruno et al. | 379/211.02 |
| 6,353,896 B1 * | 3/2002 | Holzmann et al. | 714/38.1 |
| 6,366,658 B1 * | 4/2002 | Bjornberg et al. | 379/221.08 |
| 6,493,433 B2 * | 12/2002 | Clabaugh et al. | 379/88.13 |
| 6,636,504 B1 * | 10/2003 | Albers et al. | 370/352 |
| 6,647,111 B1 * | 11/2003 | Bjornberg et al. | 379/220.01 |
| 6,654,451 B1 * | 11/2003 | Ward | 379/114.24 |
| 6,678,242 B1 * | 1/2004 | Simon | 370/218 |
| 6,724,869 B2 * | 4/2004 | Chapman et al. | 379/93.01 |
| 6,779,030 B1 | 8/2004 | Dugan et al. | |
| 6,785,374 B2 | 8/2004 | Wang et al. | |
| 6,788,777 B2 * | 9/2004 | Goldman et al. | 379/221.08 |
| 6,920,214 B1 * | 7/2005 | Sbisa et al. | 379/221.08 |
| 6,940,857 B2 * | 9/2005 | Weinman, Jr. | 370/390 |
| 7,085,362 B1 | 8/2006 | Christie et al. | |
| 7,286,545 B1 | 10/2007 | Tester et al. | |
| 7,636,430 B2 * | 12/2009 | Lang | 379/218.01 |
| 7,650,367 B2 * | 1/2010 | Arruza | 707/999.202 |
| 7,657,015 B1 * | 2/2010 | Brown et al. | 379/201.02 |
| 7,856,094 B2 * | 12/2010 | Khadri et al. | 379/219 |
| 8,184,797 B1 * | 5/2012 | Rosen | 379/218.01 |
| 8,218,527 B2 * | 7/2012 | Kung et al. | 370/352 |
| 2001/0053218 A1 * | 12/2001 | Leung et al. | 379/221.08 |
| 2002/0054674 A1 | 5/2002 | Chang et al. | |
| 2004/0228466 A1 | 11/2004 | Bedingfield, Sr. et al. | |
| 2005/0141528 A1 | 6/2005 | Matsuhashi et al. | |
| 2006/0209791 A1 | 9/2006 | Khadri et al. | |
| 2007/0140158 A1 * | 6/2007 | Schwarzbauer et al. | 370/328 |
| 2008/0181382 A1 | 7/2008 | Lean et al. | |
| 2008/0226044 A1 * | 9/2008 | Johnson | 379/93.12 |
| 2008/0260119 A1 | 10/2008 | Marathe et al. | |
| 2008/0285438 A1 | 11/2008 | Marathe et al. | |
| 2008/0294448 A1 * | 11/2008 | Holtzclaw | 705/1 |
| 2009/0041223 A1 | 2/2009 | Agarwal et al. | |
| 2010/0157986 A1 * | 6/2010 | Rao et al. | 370/352 |
| 2010/0158201 A1 * | 6/2010 | Vijay Marathe et al. | 379/36 |
| 2011/0040884 A1 | 2/2011 | Khadri et al. | |

FOREIGN PATENT DOCUMENTS

| | | |
|---|---|---|
| WO | WO 02/07456 A1 | 1/2002 |
| WO | WO 2006/102339 A2 | 9/2006 |
| WO | WO 2010/060082 A2 | 5/2010 |

OTHER PUBLICATIONS

Norris, "Toll Free Number and Advanced Routing," http://ezinearticles.com/?Toll-Free-Numbers-and-Advanced-Routing&id=699330, (article submitted on Aug. 22, 2007) (downloaded from the Internet on Dec. 29, 2009).

"Toll-Free Strategy," http://www.tollfreestrategy.com/Vanity_toll-free_Numbers_Service.cfm, (downloaded from the Internet on Dec. 29, 2009).

Notice of Allowance and Fee(s) Due for U.S. Appl. No. 11/085,620 (Sep. 17, 2010).

European Search Report for European Patent No. 1867115 (Sep. 3, 2010).

Notification of Transmittal of the International Search Report and the Written Opinion of the International Searching Authority, or the Declaration for International Application No. PCT/US2009/065733 (Jun. 15, 2010).

Official Action for U.S. Appl. No. 11/085,620 (Apr. 15, 2010).

Official Action for Chinese Patent Application No. 200680017480.6 (Mar. 18, 2010).

Final Official Action for U.S. Appl. No. 11/085,620 (Jun. 19, 2009).

Interview Summary for U.S. Appl. No. 11/085,620 (Apr. 30, 2009).

Official Action for U.S. Appl. No. 11/085,620 (Dec. 19, 2008).

Notification of European Publication Number and Information on the Application of Article 67(3) EPC for European Application No. 06 739 166.4 (Nov. 21, 2007).

"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).

"INAP Feature Module," Cisco MGC Software Release 9.5(2), pp. 1-16 (Dec. 3, 2003).

"Tekelec Introduces TekWare™ IN and TekWare Mediation," Tekelec, p. 1 (May 28, 2003).

"Tekelec Announces Advanced Signaling Architecture—TekWare," Tekelec, pp. 1-3 (Jun. 4, 2002).

"Integrated Services Digital Network (ISDN); Signalling System No. 7 (SS7); ISDN User Part (ISUP) Version 4 for the International Interface; Part 1: Basic Services," European Telecommunications Standards Institute, ETSI EN 300 356-1, V4.2.1, pp. 1-44 (May 2001).

Crowe, "Cellular Network Perspectives," Wireless Review, pp. 1-4 (Mar. 2001).

Gurbani et al., "Accessing IN services from SIP networks," Internet-Draft, pp. 1-20 (Feb. 2001).

"Integrated Services Digital Network (ISDN); Signalling System No. 7; Signalling Connection Control Part (SCCP) (connectionless and connection-oriented) to Support International Interconnection; Part 1: Protocol Specification," European Telecommunications Standards Institute, ETSI EN 300 009-1, V1.4.2, pp. 1-18 (Nov. 1999).

Haerens, "Intelligent Network Application Part (INAP) Support of the SIP/SDP Architecture," SIP Working Group, Internet Draft, pp. 1-12 (Oct. 1999).

Liao et al., "SS7-TCAP/IP Interworking," Internet Engineering Task Force, pp. 1-14 (Mar. 1999).

Aitken, "Signalling Relay Intelligence," Logica Aldiscon, pp. 1-11 (1999).

"Eagle STP Platform," Tekelec, Publication 908-0126-01, Rev. A, pp. 1-4 (Copyright 1997).

Supplemental Notice of of Allowability for U.S. Appl. No. 12/913,735 (Jan. 11, 2013).

Notice of Allowance and Fee(s) Due for U.S. Appl. No. 12/913,735 (Nov. 16, 2012).

Notice of Allowance and Fee(s) Due for U.S. Appl. No. 12/913,735 (Apr. 23, 2013).

* cited by examiner

SYSTEMS, METHODS, AND COMPUTER READABLE MEDIA FOR PROVIDING TOLL-FREE SERVICE IN A TELECOMMUNICATIONS NETWORK

PRIORITY CLAIM

This application claims the benefit of U.S. Provisional Patent Application Ser. No. 61/117,545, filed Nov. 24, 2008; the disclosure of which is incorporated herein by reference in its entirety.

TECHNICAL FIELD

The subject matter described herein relates to providing a service in a telecommunications network. More particularly, the subject matter described herein relates to systems, methods, and computer readable media for providing toll-free service in a telecommunications network.

BACKGROUND

A toll-free number is a telephone number in which the cost of the call is charged to the called party rather than to the calling party. In countries that follow the North American Numbering Plan (NANP), telephone numbers are of the form NPA-NXX-YYYY, where NPA is the numbering plan area code, roughly corresponding to a particular geographical area, and NXX is the exchange, which identifies a physical switching facility, called a central office (CO). The remaining digits, YYYY, identify a line card within the CO. When a CO detects that a subscriber whom that CO serves is attempting to place a call to called party telephone number, the values of NPA and NXX of the called party number are used by a switch to determine how to route a call.

A toll-free number, however, may have an "8XX" area code (e.g., 800, 877, 866, etc.), that does not correspond to any geographical location of the called party, and thus cannot be used by itself to determine the destination of the call or how it should be routed. For this reason, switches in conventional telecommunications networks that provide toll free service must send a query to a toll-free database to determine the true destination of the toll-free called party. For example, a CO in a signaling system number 7 (SS7) network may issue a transaction capabilities application part (TCAP) query to a service control point (SCP) that maintains a toll-free database. A query to a toll-free database is herein referred to as a "toll-free query."

Thus, in conventional telecommunications networks, toll-free (TF) service is provided by the switch, which issues a toll-free query in response to detecting an attempt to place a call to a toll-free called party. In these conventional implementations, the switch must be configured or provisioned to perform the additional steps needed to provide toll-free service. For example, when the switch detects a call attempt, the switch must additionally determine whether the called party is a toll-free number, and if so, issue a toll-free query to a toll-free database that maps the toll-free number to a directory number (DN), and receive the DN associated with the toll-free number. The switch can then route the call setup message accordingly.

In telecommunications networks that support number portability (NP), a subscriber may change location and/or service provider but still keep the same directory number. In this scenario, a subscriber may have been moved from the original switch that served the subscriber, called the donor switch, to a new switch, called the recipient switch. Thus, in telecommunications networks that support number portability, the switch must be additionally configured to perform a NP lookup using the first DN, i.e., the DN that was returned by the toll-free query. If the directory number associated with the toll-free number has been ported, the NP query may return a second DN, a routing number (RN) of the recipient switch, or both.

A telecommunications network may support wireline subscribers, wireless subscribers, or both. A "wireline subscriber" is a subscriber to or user of a network who accesses the network over a physical connection, such as a telephone line, local loop, cable modem, or other physical medium including wire or optical fiber. A "wireless subscriber" is a subscriber to or user of a network who accesses the network over a wireless connection, such as via a mobile phone, wireless LAN, wireless modem, etc. A wireless subscriber may also be referred to as a "mobile subscriber".

If the telecommunications network supports mobile subscribers, the switch must also be configured to perform a mobility management query using available information, e.g., the first DN, the second DN, or the RN. A mobility management query may return information identifying the mobile switching center that is currently serving the mobile subscriber.

There are disadvantages associated with the conventional system described above. Providing toll-free service at a switch requires that the switch be configured to perform at least one query—the toll-free query—and possibly additional queries, such as the NP query and mobility management query, which further requires the switch to maintain and support more complicated call state machines.

These additional features or capabilities may increase the cost of each switch, and this additional cost may increase in proportion to the number of switches in the telecommunications network. In addition to the direct costs associated with the additional configuration and provisioning, there is the potential for increased indirect costs associated with the additional time required to provision or update each switch. As the complexity of each switch increases, maintenance and repair may become more difficult and therefore more time consuming and costly as well. In short, configuring all of the switches in a telecommunications network to support additional protocols increases the complexity of the network and may increase the costs of deployment and maintenance of that network.

Accordingly, in light of these disadvantages associated with conventional approaches to providing toll-free service in a telecommunications network, there exists a need for improved systems and methods for providing toll-free service in a telecommunications network.

SUMMARY

According to one aspect, the subject matter described herein includes a method for providing toll-free service in a telecommunications network. The method includes, at a signaling node that includes at least one processor: receiving a first signaling message that includes a toll-free called party number, where the first signaling message is a non-TCAP call setup message, a mobility management query, a number portability query, or an E.164 number query; determining a directory number associated with the toll-free called party number; and sending the first signaling message or a second signaling message, the sent message including the directory number, the routing information associated with the directory number, or both.

According to another aspect, the subject matter described herein includes a signaling node for providing toll-free service in a telecommunications network. The node includes a communications interface for receiving a first signaling message that includes a toll-free called party number, where the first signaling message is a non-TCAP call setup message, a mobility management query, a number portability query, or an E.164 number query. The node includes a toll-free service module (TFSM), operatively associated with the signaling node, for determining a directory number associated with the toll-free called party number for sending the first signaling message or a second signaling message, the sent message including the directory number, the routing information associated with the directory number, or both.

According to another aspect, the subject matter described herein includes a system for providing toll-free service in a telecommunications network. The system includes a signaling node for receiving a first signaling message that includes a toll-free called party number, where the first signaling message is a non-TCAP call setup message, a mobility management query, a number portability query, or an E.164 number query. The system includes a toll-free service module (TFSM) for determining a directory number associated with the toll-free called party number and for sending the first signaling message or a second signaling message, the sent message including the directory number, the routing information associated with the directory number, or both.

The subject matter described herein for providing toll-free service in a telecommunications network may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps. Exemplary computer readable media suitable for implementing the subject matter described herein include non-transitory computer-readable media, such as disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer program products are provided for providing toll-free service in a telecommunications network.

Figure 1:
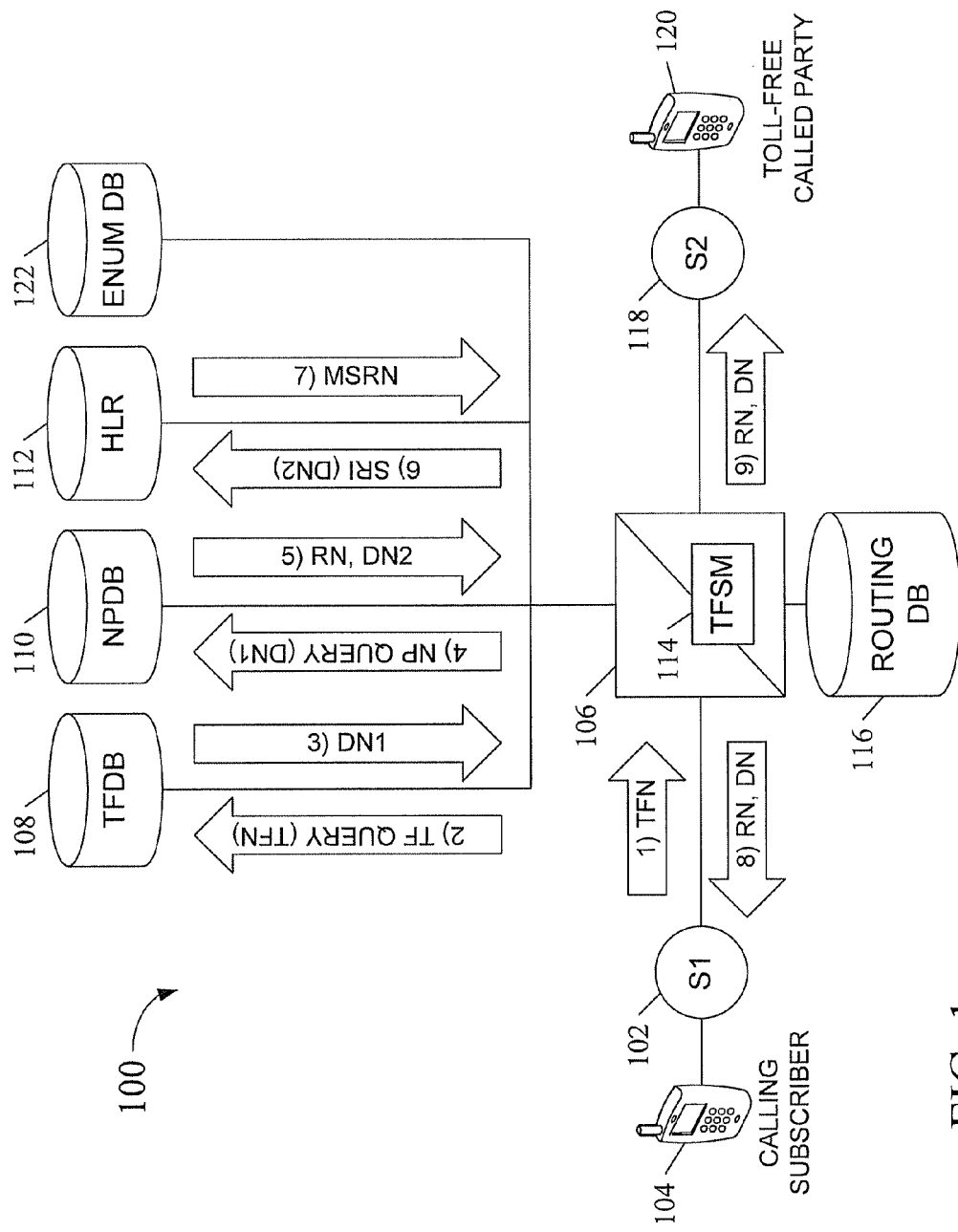
FIG. 1 is a block diagram illustrating an exemplary system for providing toll-free service according to an embodiment of the subject matter described herein.

FIG. 1 is a block diagram illustrating an exemplary system for providing toll-free service according to an embodiment of the subject matter described herein. In the embodiment illustrated in FIG. 1, telecommunications network 100 includes a first switch (S1) 102, via which a subscriber 104 accesses network 100. When S1 102 is the switch that services a calling party, such as subscriber 104, S1 102 may also be referred to as the "originating switch". In one embodiment, S1 102 may be a service switching point (SSP), such as an end office (EO) for servicing wireline subscribers. In alternative embodiments, S1 102 may be a mobile switching center (MSC) for servicing wireless or mobile subscribers, a tandem office (TO), a call session control function (CSCF), a softswitch (SS), or any other type of switch in a telecommunications network.

Network 100 may include a signaling node 106, such as a signaling message routing node, for routing signaling messages within network 100. In the embodiment illustrated in FIG. 1, signaling node 106 is a signal transfer point (STP). In alternative embodiments, the signaling message routing node may be a signaling gateway (SGW), a softswitch (SS), a media gateway controller (MGC), a media gateway (MGW), or other entity for routing signaling messages within network 100.

Network 100 may include a toll-free database (TFDB) 108, which maps toll-free numbers, such as 1-8XX numbers in the United States, to directory number. An example toll-free database is shown in Table 1, below. Each row in Table 1 represents an entry in TFDB 108, and each entry maps a toll-free number (TFN), shown in the left column, to a DN, shown in the right column. A directory number may also be referred to as a "B-party number". Referring to Table 1, the toll-free number (800) 345-0393 would be mapped to the directory number (919) 469-2255.

TABLE 1

| Toll-Free Database | |
|---|---|
| TFN | DN |
| 8003450393 | 9194692255 |
| 8002549990 | 2124586959 |
| . | . |
| . | . |
| . | . |

In one embodiment, network 100 may support number portability. In the embodiment illustrated in FIG. 1, network 100 may include a number portability database (NPDB) 110, which maps a ported subscriber's directory number (DN) to the routing number (RN) of the recipient switch.

In one embodiment, network 100 may support mobile subscribers. In the embodiment illustrated in FIG. 1, network 100 may include a home location register (HLR) 112 for maintaining information for each mobile subscriber, including information about the current location of a roaming mobile subscriber.

In one embodiment, system 100 may include a toll-free service module (TFSM) 114, for performing toll-free processing on behalf of S1 102. In the embodiment illustrated in FIG. 1, TFSM 114 is a component of signaling node 106, but in alternative embodiments, TFSM 114 may be located remotely from signaling node 106.

In one example implementation, the TFSM 114 functions may be performed in whole or in part by a service capabilities interaction manager function, such the TekSCIM® product, available from Tekelec of Morrisville, N.C. One implementation of a service capabilities interaction manager is described in commonly-assigned U.S. patent application Ser. No. 12/106,807, entitled "Systems, methods, and computer program products for providing service interaction and mediation in a communications network", filed on Apr. 21, 2008, the disclosure of which is incorporated by reference herein in its entirety. Another implementation of a service capabilities interaction manager is described in commonly-assigned U.S. patent application Ser. No. 12/106,869, entitled "Methods, systems, and computer program products for providing fault-tolerant service interaction and mediation function in a communications network", also filed on Apr. 21, 2008, the disclosure of which is incorporated by reference herein in its entirety.

In one embodiment, system 100 may include a routing database 116 for mapping directory numbers to routing numbers. An example routing database is shown in Table 2, below. Each row of Table 2 represents an entry in routing database 116, and each entry maps a range of directory numbers, shown in the left column, to routing information, shown in the right column. The routing information may be a routing number (RN), a local routing number (LRN), a mobile switch routing number (MSRN), or other type of routing information.

TABLE 2

Routing Database

| DN RANGE | RN/LRN/MSRN |
|---|---|
| 919000XXXX-919999XXXX | 3365550000 |
| 212000XXXX-212999XXXX | 3365550001 |
| . | . |
| . | . |
| . | . |

Referring to Table 2, directory numbers in the range of (919) 000-0000 through (919) 999-9999 would be mapped to routing number (336) 555-0000, and directory numbers in the range (212) 000-0000 through (212) 999-9999 would be mapped to routing number (336) 555-0001. Like TFSM 114, above, routing database 116 may be internal or external to signaling node 106.

In the embodiment illustrated in FIG. 1, system 100 includes a second switch (S2) 118, which serves toll-free called party 120. When a switch, such as S2 118, services a called party, such as called party 120, that switch may also be referred to as the "terminating switch". Like S1 102, S2 118 may be an SSP, an EO, an MSC, a TO, a CSCF, an SS, or other type of switching point.

System 100 may also include other types of databases. For example, in the embodiment illustrated in FIG. 1, system 100 includes an E.164 (ENUM) database 122. The operation of system 100 will be described in more detail in the description of FIGS. 3 and 4, below.

The system embodied in FIG. 1 significantly differs from conventional systems. In contrast to conventional systems, in which the burden of performing the toll-free query rests on an originating switch, such as S1 102, the toll-free service is provided instead by a signaling node, such as signaling node 106. This arrangement has several distinct benefits.

First, by removing the necessity for a switch to support additional protocols, such as IN/AIN/WIN and CAMEL, the complexity of every switch in network 100, e.g., S1 102 and S2 118, may be reduced. This may result in lower hardware and maintenance costs for network 100.

Second, because networks typically have more switches than signaling message routing nodes, the additional cost of signaling node 106, for example, is likely to be offset several times over by the cost savings achieved in S1 102, S2 118, and other switches.

Third, signaling node 106 may perform both triggered and triggerless toll-free lookups. As used herein, a "triggered" operation is one that is explicitly initiated by an end office or other switch, which usually initiates the operation via an explicit request or query. A "triggerless" operation, by comparison, is triggered by some mechanism other than an explicit request for the operation. A triggerless operation may be initiated as a result of detection of a specific event, by interception of a type or class of message, etc. FIGS. 5A through 7C and 10A illustrate triggered embodiments, while FIGS. 8A through 9D, 10B, and 100 illustrate triggerless embodiments. These figures will be described in more detail, below.

Figure 5A:
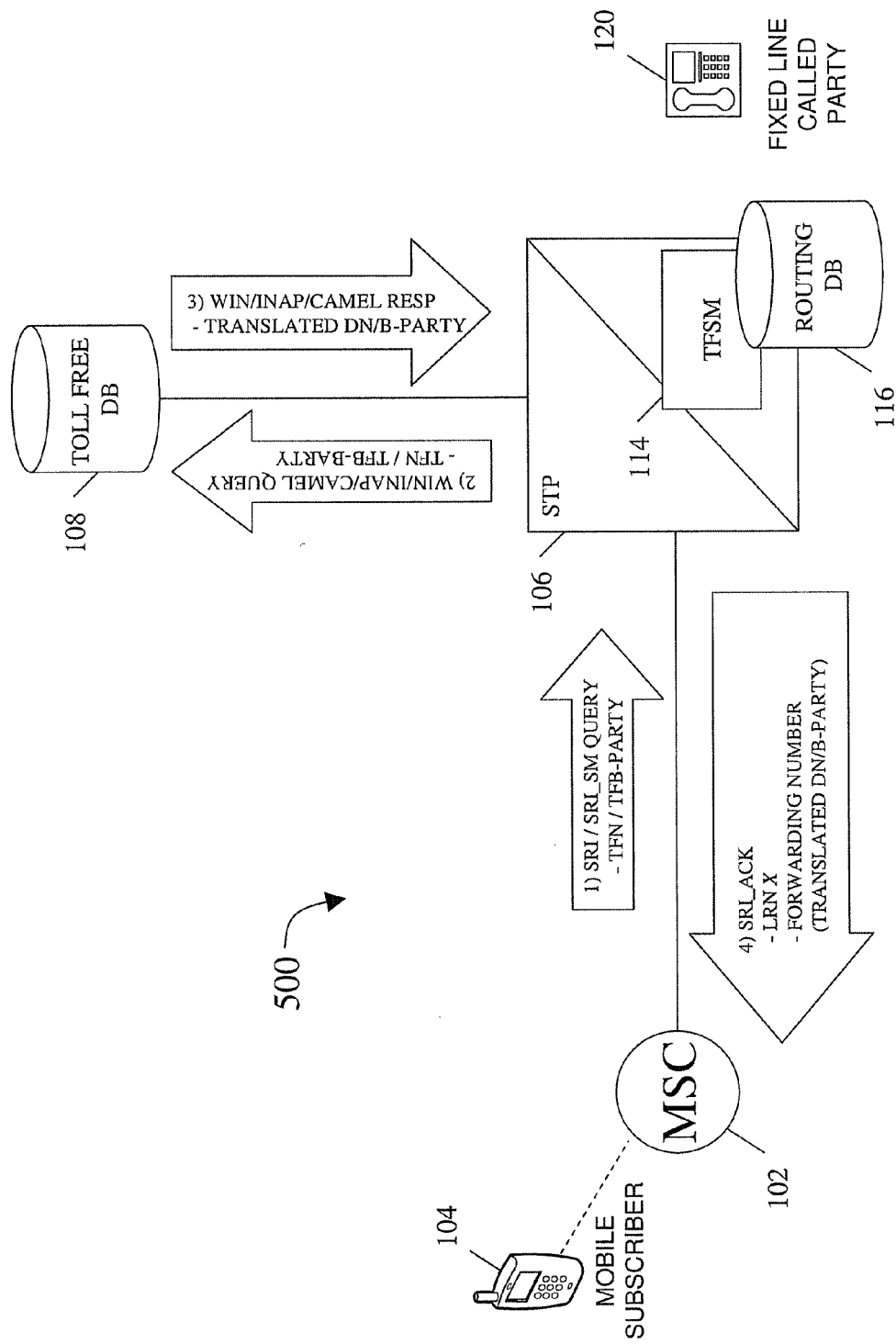
FIG. 5A is a block diagram illustrating an exemplary system for providing toll-free service in a telecommunications network according to another embodiment of the subject matter described herein, including exemplary signaling messages that may be generated during a mobile-to-wireline call setup in a network that does not support number portability.
Figure 6:
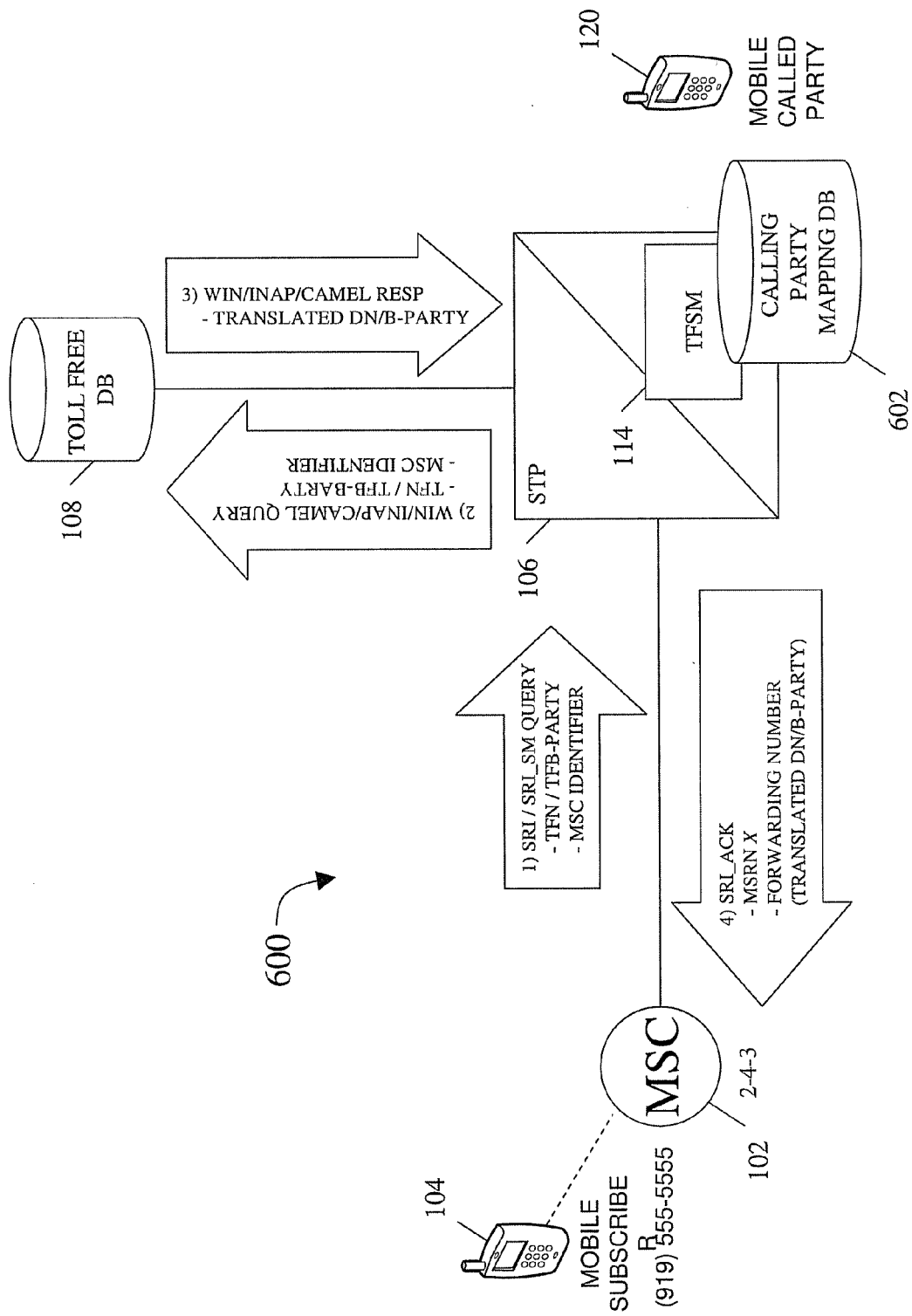
FIG. 6 is a block diagram illustrating an exemplary system for providing toll-free service in a telecommunications network according to another embodiment of the subject matter described herein, in which the identity of the switch that is serving the calling mobile subscriber is provided as part of the toll-free number lookup.
Figure 7A:
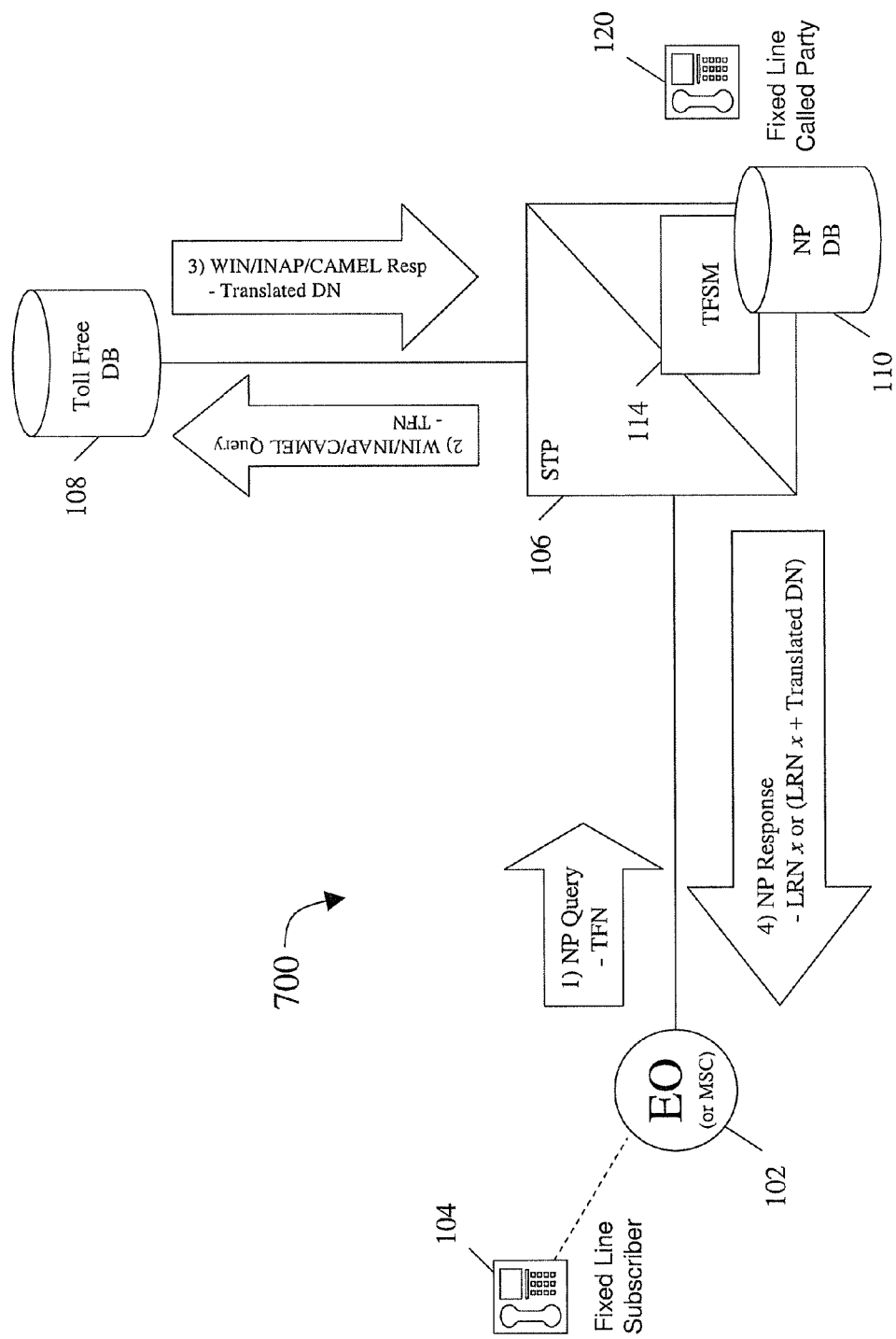
FIG. 7A is a block diagram illustrating an exemplary system for providing toll-free service in a telecommunications network according to another embodiment of the subject matter described herein, including exemplary signaling messages that may be generated during a wireline-to-wireline call setup in a network in which supports number portability.
Figure 7B:
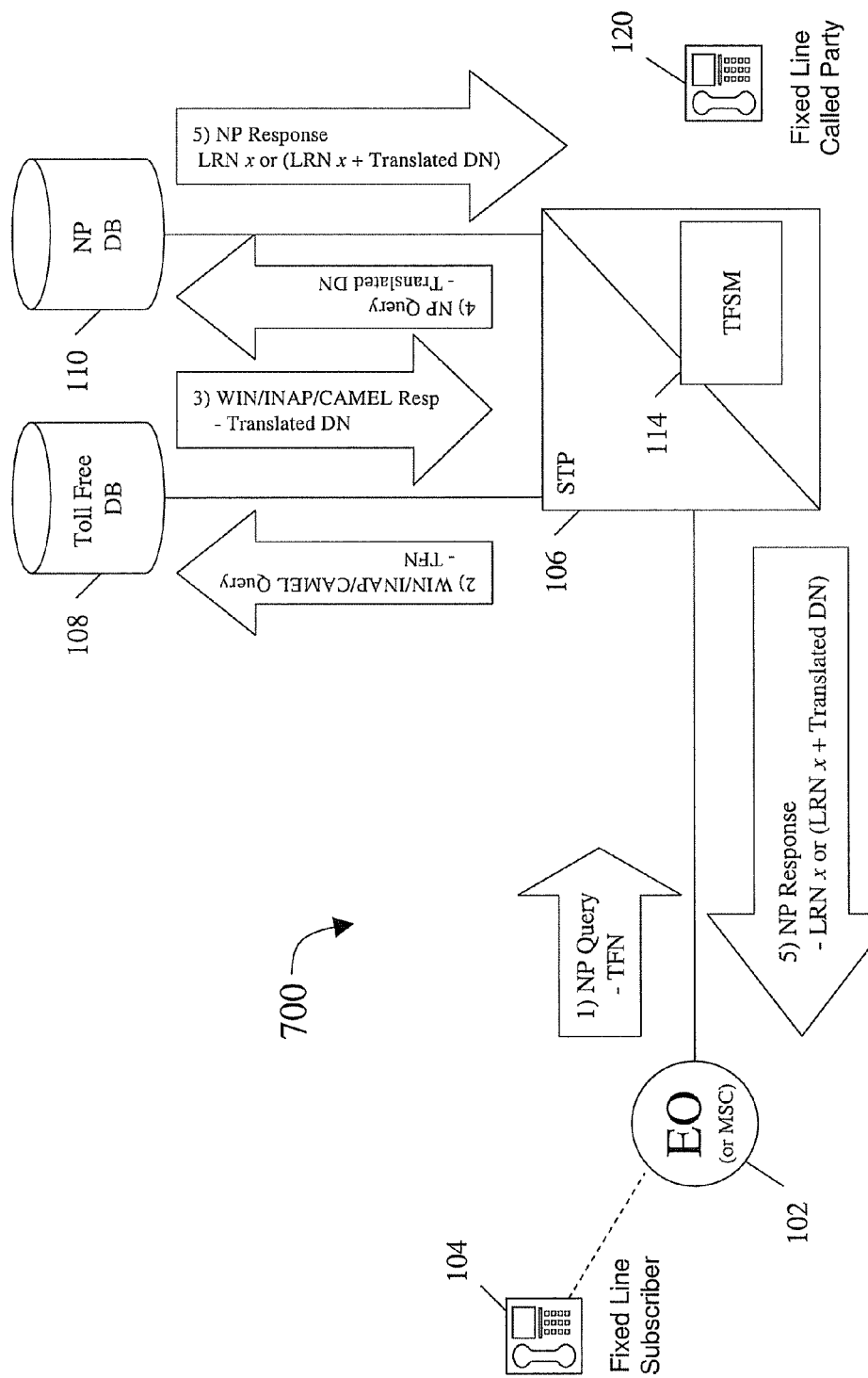
FIG. 7B is a block diagram illustrating an exemplary system for providing toll-free service in a telecommunications network according to another embodiment of the subject matter described herein, where the number portability database is located remotely from the signaling message routing node.
Figure 7C:
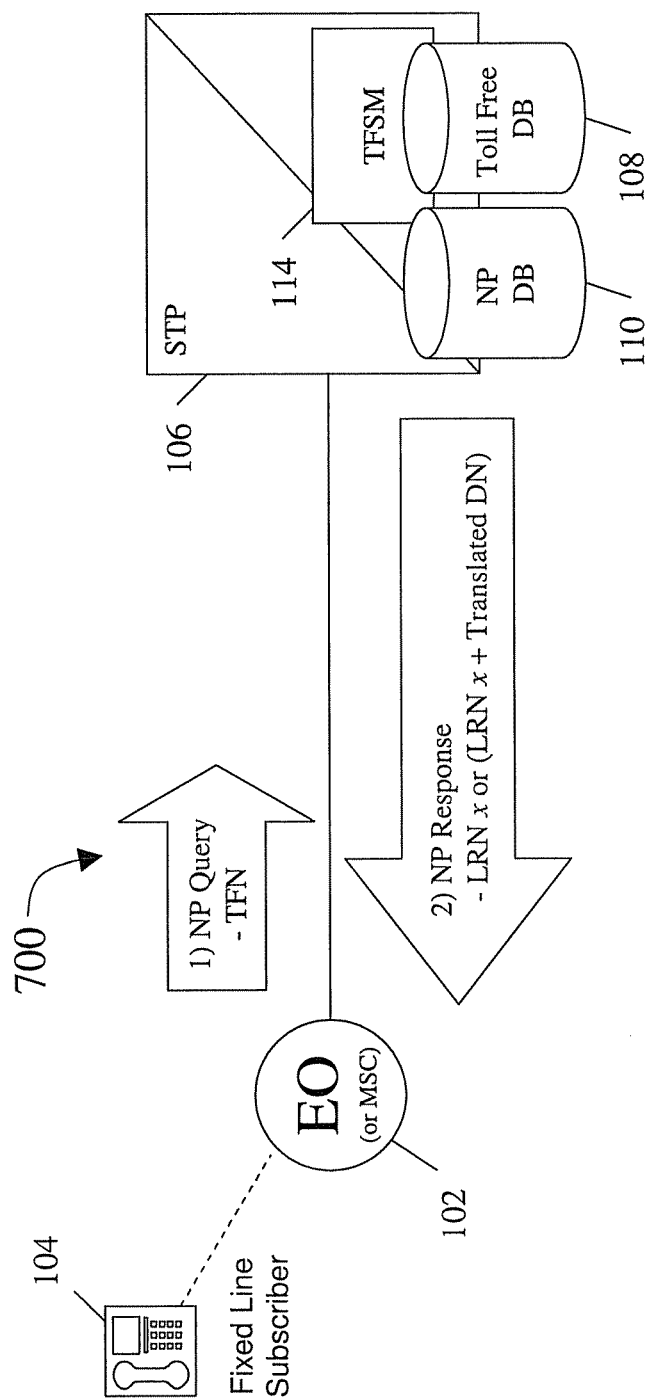
FIG. 7C is a block diagram illustrating an exemplary system for providing toll-free service in a telecommunications network according to another embodiment of the subject matter described herein, where the toll-free database and the number portability database are components of the signaling message routing node.

Fourth, S1 102 in network 100 may reuse existing triggers to perform toll-free operations. For example, S1 102 may be configured so that calls to a toll-free number are treated the same way that calls to a mobile subscriber are treated, e.g., S1 102 issues an SRI query including the TFN. Alternatively, S1 102 may be configured so that calls to a toll-free number are treated the same way that calls to potentially ported subscribers are treated, e.g., S1 102 issues a NP query including the TFN. In this manner, an S1 102 can implement toll-free services by using (or reusing) existing protocols, without having to add support for other protocols. As used herein, the term "native protocol" refers to a protocol which the switch already supports and uses for non-toll-free services. Various embodiments may use various native protocols. FIGS. 5A through 6 illustrate embodiments which reuse a mobility management protocol to provide toll-free service. FIGS. 7A through 7C illustrate embodiments which reuse a number portability protocol to provide toll-free service.

In both of the scenarios just described, signaling node 106 is configured to recognize the SRI query (or NP query, as the case may be) as a toll-free query and respond appropriately.

Fifth, some legacy networks may have switches that do not support toll-free triggers, or that do not support the additional protocols needed to access TFDB 108. In these networks, toll-free service could be provided triggerlessly by signaling node 106, obviating the need to perform expensive upgrades to switches in the legacy network.

An exemplary operation of network 100 will now be described with reference to FIGS. 1, 2, and 3.

Figure 2:
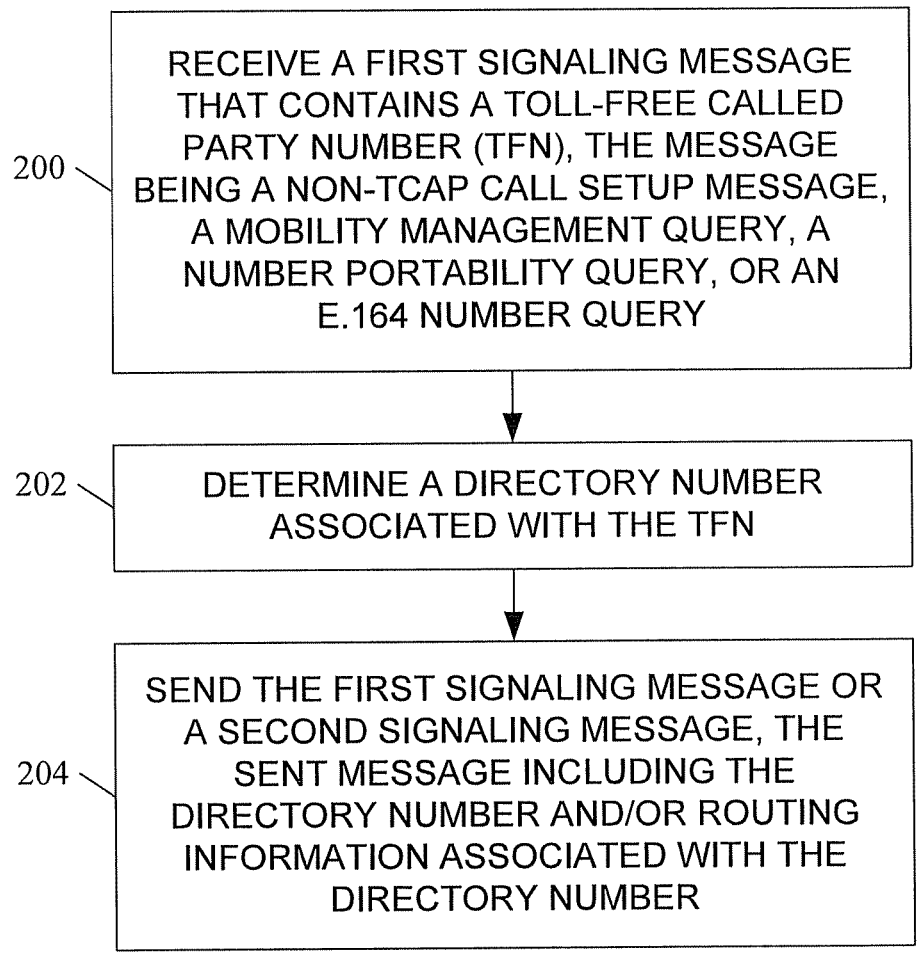
FIG. 2 is a flow chart illustrating an exemplary process for providing toll-free service in a telecommunications network according to an embodiment of the subject matter described herein.

FIG. 2 is a flow chart illustrating an exemplary process for providing toll-free service in a telecommunications network according to an embodiment of the subject matter described herein. At block 200, a first signaling message is received from a switch, the first signaling message including a toll-free called party number, abbreviated as "TFN" (FIG. 1, message 1). The first signaling message may be a non-TCAP call setup message, a mobility management query, a number portability query, or an E.164 number query.

For example, in one embodiment, S1 102 may send a non-TCAP call setup message (FIG. 1, message 1), such as an ISUP initial address message (IAM), an ISUP subsequent address message (SAM), a bearer-independent call control (BICC) message, or a SIP INVITE message, that includes the toll-free called party number.

In another embodiment, calling subscriber 104 may be a mobile subscriber and S1 102 may be a mobile switching center (MSC), which may issue a mobility management message, such as a mobile application part (MAP) send routing information (SRI) message, a MAP send routing information for short message (SRI_SM) message, an anytime interrogation (ATI) message, or an ANSI-41 location request (LOCREQ) message, that includes the toll-free called party number.

In yet another embodiment, calling subscriber 104 may be a wireline subscriber and S1 102 may be an end office (EO), a central office (CO), a service switching point (SSP), or similar entity, which may issue a call setup message that includes the toll-free called party number. In another embodiment, S1 102 may issue a number portability (NP) query that includes the toll-free called party number.

In yet another embodiment, calling subscriber 104 may be a user agent client (UAC) in a session initiation protocol (SIP) network and S1 102 may be a SIP router, SIP application server (SAS), media gateway (MGW), or similar entity, which may issue SIP INVITE message, an ENUM query, or other message that includes the toll-free called party number.

At block 202, a directory number associated with the toll-free called party number is determined. As will be described in more detail in additional figures, below, this process may involve issuing a toll-free query (FIG. 1, message 2) to TFDB 108 and receiving a response (FIG. 1, message 3), issuing a number portability query (FIG. 1, message 4) to NPDB 110 and receiving a response (FIG. 1, message 5), issuing a mobility management query (FIG. 1, message 6) to HRL 112 and receiving a response (FIG. 1, message 7), issuing an ENUM query to ENUM database 122 and receiving a response (messages not shown in FIG. 1), or some combination of the above.

At block 204, either the first signaling message or a second signaling message is sent. The sent message includes the directory number and/or routing information associated with the toll-free called party number. In one scenario, such as a triggerless embodiment, the original message (i.e., the first signaling message) may be modified and sent forward to the intended destination, or a new message (i.e., the second signaling message) may be generated and sent forward to the intended destination. In another scenario, such as a triggered embodiment, a new signaling message (i.e., the second signaling message) may be generated and sent back to the sender of the first message, e.g., the second message may be a response to the first message query. Blocks 202 and 204 will now be described in more detail in FIG. 3.

Figure 3:
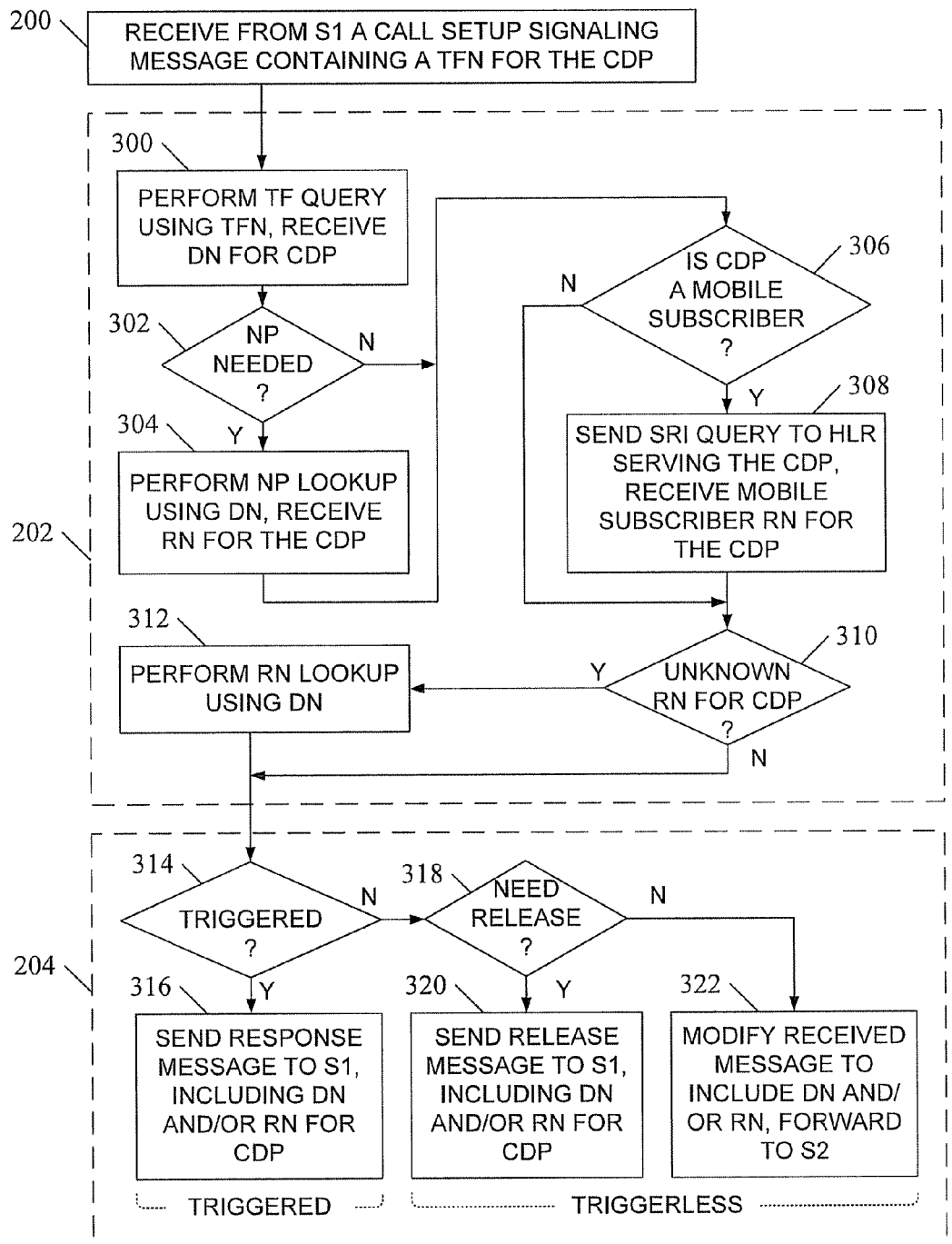
FIG. 3 is a flow chart illustrating in more detail an exemplary process for providing toll-free service in a telecommunications network according to an embodiment of the subject matter described herein.

FIG. 3 is a flow chart illustrating in more detail an exemplary process for providing toll-free service in a telecommunications network according to an embodiment of the subject matter described herein. This process will be described with reference to FIGS. 1 and 3. FIG. 3 illustrates blocks 200, 202 and 204 of FIG. 2, with blocks 202 and 204 in particular shown in more detail. Block 202 of FIG. 2 is shown as a series of sub-blocks 300, 302, 304, 306, 308, 310, and 312 in FIG. 3. Block 204 of FIG. 2 is shown as a series of sub-blocks 314, 316, 318, 320, and 322 in FIG. 3.

Referring to FIG. 3, at block 200, S1 102 sends a signaling message containing a toll-free number from calling subscriber 104. For example, S1 102 detects an attempt by calling subscriber 104 to place a call to toll-free called party 120, and in response, sends a signaling message containing the toll-free number to signaling node 106 (FIG. 1, message 1). As stated above, this signaling message may take a variety of forms. In one embodiment, S1 102 sends a non-TCAP call setup message to signaling node 106. In alternative embodiments, S1 102 issues a NP query, mobility management query, or ENUM query to signaling node 106, the query containing the toll-free number. In the embodiment illustrated in FIG. 1, signaling node 106 forwards the received signaling message to TFSM 114 for processing.

At block 300, the toll-free number is used to perform a toll-free query, which returns a directory number for the toll-free called party. For example, TFSM 114 issues a toll-free query (FIG. 1, message 2) to TFDB 108, the toll-free query including the toll-free number. TFDB 108 may respond with a directory number (DN1) for the toll-free number (FIG. 1, message 3). Example query/response message protocols include, but are not limited to, a transaction capabilities application part (TCAP) protocol, a mobile application part (MAP) protocol, IN/AIN/WIN protocols, a CAMEL protocol, and other suitable protocols.

At block 302, it is determined whether a number portability lookup is needed for the directory number returned by the toll-free query. In the embodiment illustrated in FIG. 1, for example, TFSM 114 determines whether a number portability lookup is needed for DN1. If a number portability lookup is needed, the process moves to block 304, and if not, the process moves to block 306.

At block 304, a number portability query is performed using DN1, which may return a routing number that identifies the switch currently serving the subscriber, if the subscriber has been ported to a recipient switch. In the embodiment illustrated in FIG. 1, for example, TFSM 114 issues a NP query (FIG. 1, message 4) to NPDB 110, the NP query including DN1. NPDB 110 may respond with a routing number, RN, a second directory number, DN2, or both (FIG. 1, message 5). The process then moves to block 306.

At block 306, it is determined whether the called party is a mobile subscriber. In the embodiment illustrated in FIG. 1, for example, TFSM 114 may analyze DN1, RN, or DN2 (depending on whether or not an NP query was required) to determine whether the called party is a mobile subscriber. If so, TFSM 114 seeks to determine the current location of the mobile subscriber, toll-free called party 120. If toll-free called party 120 is a mobile subscriber, the process moves to block 308, and if not, the process moves to block 310.

At block 308, a mobility management query, such as a send routing information (SRI) query, may be issued. In the embodiment illustrated in FIG. 1, for example, TFSM 114 sends an SRI query (FIG. 1, message 6) to a network entity, such as HLR 112, that can provide routing information, the SRI query including DN1, DN2, or RN. An SRI query is a mobile application part (MAP) message that is sent to the subscriber's HLR to request routing information in order to route a call towards a mobile subscriber. The SRI message typically includes information identifying the mobile subscriber, such as the mobile subscriber's directory number. HLR 112 may respond with the address of a visited mobile switching center (VMSC), a mobile station roaming number (MSRN), or other information identifying the mobile switching center that is currently serving the mobile subscriber (FIG. 1, message 7). In an alternative embodiment, TFSM 114 may send a query, such as a message using the DIAMETER protocol, to a home subscriber server (HSS). The process then moves to block 310.

At block 310, TFSM 114 may not yet have routing information for the directory number. This could occur, for example, if it was determined at block 302 that an NP query was not needed and it was determined at block 306 that a mobility management query was not needed. Thus, at block 310 it is determined whether routing information is yet unknown for the DN for the toll-free called party. If routing information is needed, the process moves to block 312; otherwise, the process moves to block 314.

At block 312, routing information, such as a routing number, may be determined for DN. In the embodiment illustrated in FIG. 1, for example, TFSM 114 queries routing database 116, which may be local or remote to TFSM 114. The process then moves to the series of steps that make up block 204, starting with block 314.

At block 314, it is determined whether the toll-free service was triggered or triggerless. In the embodiment illustrated in FIG. 1, for example, TFSM 114 determines whether the toll-free service is triggered or triggerless based on the type of message that was received by signaling node 106: non-TCAP call setup messages will be processed triggerlessly, and the process will move to block 318, but queries, such as NP, mobility management, or ENUM queries, indicate a triggered request, and the process will move to block 316.

The triggered process starts at block 316, in which TFSM 114 sends a response message (FIG. 1, message 8) that includes the directory number, routing information, or both, to S1 102, and the process ends. In one embodiment of triggered toll-free service, S1 102 may be configured to treat toll-free numbers as mobile subscriber numbers, in which case S1 102 will send an SRI message to TFSM 114, which will respond by sending an SRI_ACK message back to S1 102. In another embodiment of triggered toll-free service, S1 102 may be configured to treat all toll-free numbers as potentially ported numbers, in which case S1 102 will send a NP query to TFSM 114, which will respond by sending an NP response message back to S1 102. In yet another embodiment of triggered toll-free service, S1 102 may be configured to perform an ENUM query on all toll-free numbers, in which case S1 102 will send an ENUM query to TFSM 114, which will respond by sending an ENUM response message back to S1 102.

It is important to note that for the triggered implementations, the query message may be addressed to signaling node 106, or it may be addressed to another node, e.g., to NPDB 110, ENUM DB 122, etc., but intercepted by signaling node 106. In the embodiment illustrated in FIG. 1, the signaling message is processed by TFSM 114 in either case.

The triggerless process starts at block 318, in which it is determined whether a release is needed, i.e., whether a bearer path has been reserved to the wrong destination and should be released for use by another call. If a release is needed, the process moves to block 320. If a release is not needed, the process moves to block 322.

At block 320, TFSM 114 sends a release message (FIG. 1, message 8) to S1 102, the release message including the directory number and/or routing information for the toll-free called party number, and the process ends. As used herein, the term "release message" refers to a message sent to an entity, such as a switch, that manages call paths. In one embodiment, the message includes information by which the entity may determine that a particular bearer path that has been reserved in anticipation of use by a call is no longer needed. One example of such a message is the ISUP RELEASE message. In another embodiment, the release message may indicate that the originating switch should attempt to connect the call path via another destination node. One example of such a message is the SIP REDIRECT message. The release/redirect message may also contain enough information to allow the entity to determine which bearer path should be reserved or which call path should be used instead.

At block 322, TFSM 114 modifies the received message (FIG. 1, message 1) to include the directory number and/or routing information and forwards the modified message to its destination, and the process ends. In the embodiment illustrated in FIG. 1, for example, TFSM 114 may send the modified message (FIG. 1, message 9) to S2 118, the switch that serves toll-free called party 120. In one embodiment, system 100 may be a packet network, in which case there is no reservation of a bearer path In one embodiment of triggerless toll-free service, signaling node 106 and TFSM 114 may be configured to intercept and detect ISUP IAM, SAM, or BICC messages containing a toll-free called party number. In circuit-switched networks, S1 102 will typically reserve a bearer circuit to another network node, herein referred to as the "destination node", as part of the call setup process. Also, S1 102 will typically select the destination node based on the called party number. However, since the called party number received by S1 102 is a toll-free called party number, S1 102 may not have enough information to determine the correct destination node and may need a DN or routing information to determine how to route the signaling message.

Therefore, before the DN and/or routing information has been determined, the actions that a switch in a circuit switched network, such as S1 102, may take when processing a call setup to a toll-free called party number includes, but is not limited to, the following: 1) reserve a bearer circuit that is currently available; 2) reserve whichever bearer circuit has the least amount of traffic at that time; 3) reserve a bearer circuit to a destination node identified as the preferred destination, at least initially, for all toll-free called party calls; 4) reserve a dummy bearer circuit; or 5) reserve no bearer circuit at all. In one embodiment, S1 102 may maintain or have access to a list of destination nodes for one or more toll-free numbers, in which case S1 102 may reserve a bearer circuit to what is likely to be the correct destination node. This is not intended to be an exhaustive list, but is intended to illustrate the point that an S1 102 may not be able to rely on a portion of the called party number, such as the area code, to help it determine which bearer circuit to reserve, leading to an increased likelihood that S1 102 guessed incorrectly.

If S1 102 does guess incorrectly, for example, if S1 102 reserves a trunk circuit to the wrong switch (S3), not shown in FIG. 2, there are at least two ways to correct the situation. One approach is to keep the bearer path between S1 102 and S3, and simply create a new bearer path between S3 and the correct destination, S2 118. This first approach is inefficient, however, because two bearer circuits are occupied—between S1 102 and S3, and between S3 and S2 118—when only one circuit between S1 102 and S2 118 would be sufficient. Another approach is to dismantle the bearer path between S1 102 and S3 and establish a new path between S1 102 and S2 118. This second approach is implemented by the use of release messages, such as the ISUP REL message. For example, signaling node 106 may issue an ISUP REL message (FIG. 1, message 8) to S1 102 containing routing information RN. Upon receipt of the ISUP REL message, S1 102 may release the bearer circuit that it had reserved and reserve another bearer circuit between itself and the switch identified by RN. In merged networks comprising both circuit-switched and packet-switched technologies, the SIP REDIRECT message could be issued by a SIP node, for example, and be converted into an ISUP REL message at a signaling gateway. Other release messages are contemplated.

If S1 102 reserved a bearer path to the correct destination node, or if network 100 does not support release messages, for example, TFSM 118 may determine, at block 318, that a release is not necessary and may send the second signaling message (FIG. 1, message 9) on toward the destination switch S2 118. This message may be a new call setup message or it may be the original message, i.e., FIG. 1, message 1, that has been modified to include the DN and/or RN information associated with the toll-free called subscriber.

Whether the second signaling message is sent forward to S2 118 or back to S1 102, the sent message includes the DN and/or routing information associated with the toll-free called party. In the examples described in FIGS. 2 and 3, a routing information associated with the DN is a routing number, but the subject matter described herein is not so limited. A routing number is one form of switch identity or switch address by which the identity or location of S2 118 may be identified for the purpose of correctly routing signaling messages, but other forms of switch identity or address are also contemplated to be within the scope of the subject matter claimed. For example, the routing information may be a routing number (RN), a local routing number (LRN), a mobile station roaming number (MSRN), a signaling system 7 (SS7) network address, a point code and subsystem number (PC/SSN), a visited mobile switching center (MSC) identifier, a network node identifier, a switch identifier, a switch address, a message service center address, a voice mail server identifier, an interactive voice response (IVR) server identifier, a network identifier, a universal resource identifier (URI), a session initiation protocol (SIP) address, an IP address, a domain name, or other information which may be used to route signaling messages.

In the embodiment described above, the toll-free service functions are performed by a separate entity, TFSM 114, but the subject matter described herein is not so limited; it will be obvious to one of ordinary skill in the art that the functions attributed to TFSM 114 may be embodied in separate modules within signaling node 106, distributed between signaling node 106 and another network entity, or implemented in other configurations within the scope of the subject matter claimed.

Figure 4:
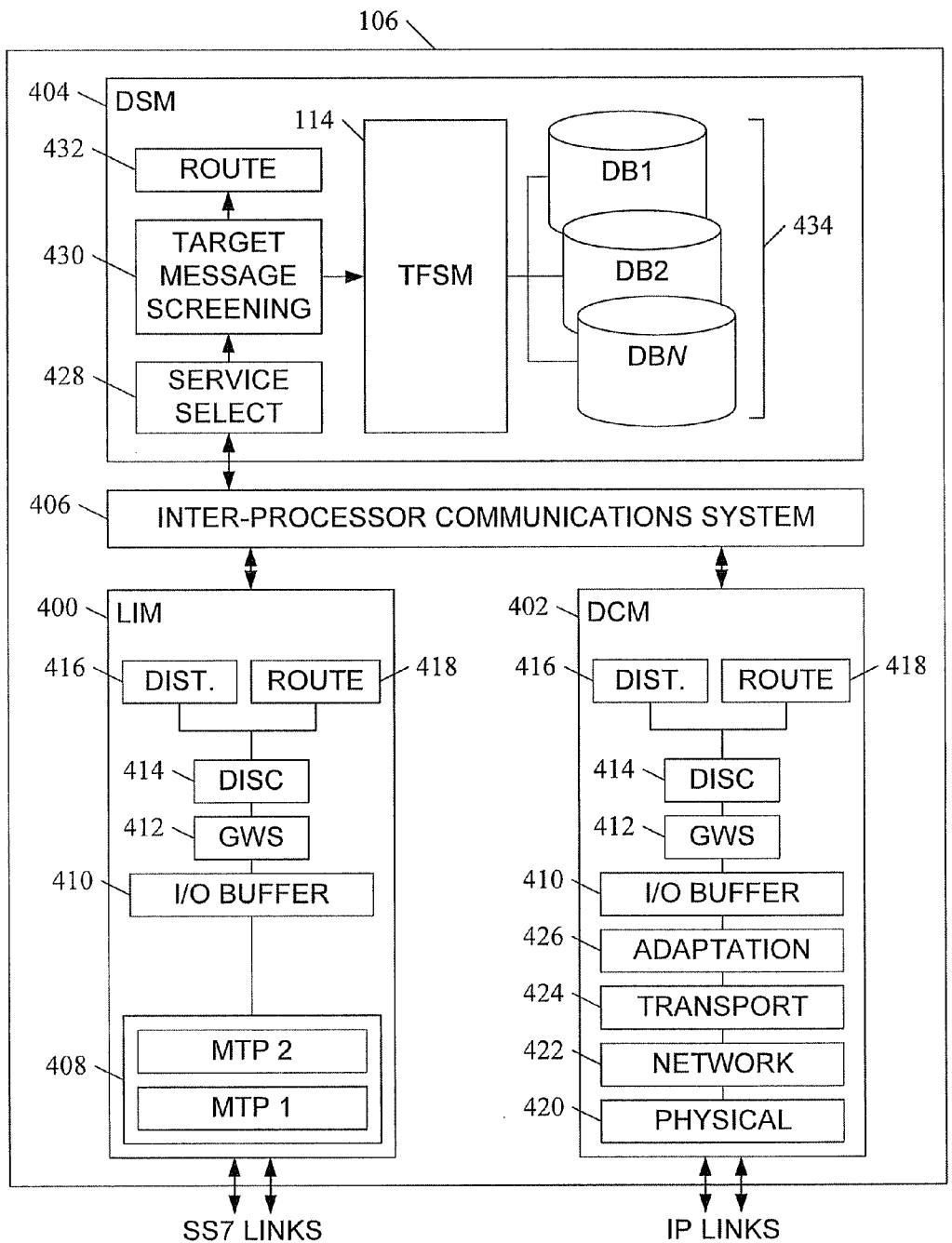
FIG. 4 is a block diagram illustrating an exemplary signaling message routing node for providing toll-free service in a telecommunications network according to another embodiment of the subject matter described herein.

FIG. 4 is a block diagram illustrating an exemplary signaling message routing node 106 for providing toll-free service in a telecommunications network according to another embodiment of the subject matter described herein. In one embodiment, signaling node 106 may be a signal transfer point (STP). Node 106 includes a link interface module (LIM) 400, a data communications module (DCM) 402, and a database services module (DSM) 404. Each module 400, 402, and 404 may include a printed circuit board having one or more processors. For example, each module may include an application processor for performing application level processing of signaling messages, and a communications processor for controlling inter-processor communications via inter-processor communications system 406. Inter-processor communications system 406 may be any suitable mechanism for providing message communication between processing modules 400, 402, and 404. For example, communications system 406 may be a bus, an Ethernet LAN, or any other suitable mechanism for providing communications between processors.

LIM 400 includes various functions for sending and receiving signaling messages over SS7 signaling links. In the illustrated example, LIM 400 includes a message transfer part (MTP) level 1 and 2 function 408, an I/O buffer 410, a gateway screening (GWS) function 412, a discrimination function 414, a distribution function 416, and a routing function 418. MTP level 1 and 2 function 408 performs MTP level 1 and 2 functions, such as error detection, error correction, and sequencing of signaling messages. I/O buffer 410 stores inbound signaling messages before the messages are processed by higher layers. I/O buffer 410 also stores outbound signaling messages waiting to be transmitted over a signaling link by MTP level 1 and 2 function 408. Gateway screening function 412 screens inbound signaling messages based on destination point code and, optionally, based on originating point code to determine whether the messages should be allowed into the network. Discrimination function 414 analyzes the destination point code in each received signaling message to determine whether the signaling message should be processed by an internal processing module within node 106 or whether the message should be routed over an outbound signaling link. Discrimination function 414 forwards messages that are to be internally processed to distribution function 416. Discrimination function 414 forwards messages that are to be routed over an outbound signaling link to routing function 418.

Distribution function 416 distributes messages that are identified as requiring internal processing to the appropriate internal processing module. For example, distribution function 416 may forward SCCP messages to database services module 404 for SCCP processing. Routing function 418 routes signaling messages that are addressed to point codes other than the point code of node 106. For example, routing function 418 may forward messages to another link interface module (not shown in FIG. 8) or to data communications module 402 for transmission over an outbound signaling link.

DCM 402 includes various functions for sending and receiving signaling messages over IP signaling links. Example signaling messages include SS7over IP messages, session initiation protocol (SIP) messages, and others. In FIG. 8, these functions include a physical layer function 420, a network layer function 422, a transport layer function 424, an adaptation layer function 426, and SS7 MTP functions 410, 412, 414, 416, and 418 as described with regard to LIM 400. Physical layer function 420 may be any suitable physical layer function for sending and receiving frames that encapsulate network layer packets. In one exemplary implementation, physical layer function 420 may be implemented using an Ethernet transceiver. Network layer function 422 may be implemented using Internet protocol, such as IPv4 or IPv6. Transport layer function 424 may be implemented using any suitable transport layer protocol. Examples of transport protocols suitable for use with embodiments of the subject matter described herein include user datagram protocol (UDP), transmission control protocol (TCP), and stream control transmission protocol (SCTP). Adaptation layer function 426 may be implemented using any suitable adaptation layer, including adaption layers for sending SS7 messages over IP. Examples of adaptation layers suitable for use with the subject matter described herein include M3UA, M2PA, SUA, and TALI, as described in the correspondingly named IETF Internet drafts and RFCs. The remaining functions of DCM 402 are the same as those described with regard to LIM 400. Hence, a description thereof will not be repeated herein.

DSM 404 includes various functions and databases for processing signaling messages. In the illustrated example, DSM 404 includes a service selection function 428, a target message screening function 430, and a routing function 432. Database services module 404 also includes toll-free service module (TFSM) 114 for processing signaling messages related to toll-free calls.

Service selection function 428 receives messages from interface processors and determines the type of service required for each message. For example, service selection function 428 may determine whether further screening of messages is required or whether the messages are simply to be global title translated and routed. For CAP or INAP messages, service selection function 428 may forward the messages to target message screening function 430. Target message screening function 430 screens CAP or INAP messages received by DSM 404 to identify targeted message types. According to the subject matter described herein, target message screening function 430 may identify call setup messages, such as ISUP IAM or SAM, as a targeted message type requiring further processing. For call setup messages, targeted message screening function 430 may communicate with TFSM 114 to process signaling messages associated with toll-free calls.

In one embodiment, TFSM 114 may receive a mobility management message related to a toll-free call. For example, TFSM 114 may receive an SRI message including a toll-free number (FIG. 1, message 1). In response, TFSM 114 may identify the SRI message as one that requires toll-free processing and take appropriate action. For example, TFSM 114 may generate a TF query and send the generated query to TFDB 108 via LIM 400 or DCM 402 as appropriate (FIG. 1, message 2). TFSM 114 may subsequently receive a response to the TF query (FIG. 1, message 3), and perform additional queries to other databases as needed.

In the embodiment illustrated in FIG. 1, databases TFDB 108, NPDB 110, and HLR 112 are external to signaling node 106, which issues queries and receives responses via network 100. In the embodiment illustrated in FIG. 2, signaling message routing node 106 may include local databases 434. In one embodiment, DSM 404 may include an internal toll-free database, an internal number portability database, an internal HLR database, and so on. It will be obvious to one of skill in the subject matter described herein contemplates both internal and external, local and remote databases, in any combination.

As used herein, the term "database" refers to a database, a table, a data structure, a portion of memory or data storage, or other means to store and retrieve data, in particular two pieces of data in a key/value relationship. Thus, the term "database query" refers to not only a database query, but also a table lookup or access to a data structure, for example. A database query, such as may be used to determine a directory number associated with a toll-free called party number or to determine routing information associated with a directory number, could be performed using one or more protocols, including but not limited to a TCAP or MAP protocol, an Internet protocol (IP), a signaling connection and control part (SCCP) user adaptation (SUA) protocol, a session initiation protocol (SIP), or other protocols usable to perform a data query.

FIGS. 5A-5F each include a block diagram illustrating an exemplary system for providing toll-free service according to another embodiment of the subject matter described herein. FIGS. 5A-5F illustrate the use of the send routing information (SRI) to provide toll-free service. In each of FIGS. 5A-5F, telecommunications network 500 includes: a switch S1 102, which may be a mobile switching center (MSC), via which a subscriber, such as mobile subscriber 104, accesses network 500; a signaling node 106, which includes a toll-free service module (TFSM) 114; a toll-free database (TFDB) 108 for mapping a toll-free number associated with called party 220 to a directory number; and one or more databases for determining a routing number, such as number portability database NPDB 110 or routing database 116. Unless otherwise noted, the functions of elements 102, 104, 106, 108, 114, 116, and 120 are substantially identical to the like-numbered elements in FIG. 1, and therefore their descriptions will not be repeated herein.

FIG. 5A is a block diagram illustrating an exemplary system for providing toll-free service in a telecommunications network according to another embodiment of the subject matter described herein. FIG. 5A illustrates exemplary signaling messages that may be generated during a mobile-to-wireline call setup in a network that does not support number portability. Mobile subscriber 104 initiates a call to a toll-free called party number that is associated with wireline subscriber 120. In one embodiment, S1 102 may be configured to issue an SRI query (FIG. 5A, message 1) in response to a determination that the called party number is a toll-free number, such as by a determination that the called party number is a 1-8XX number. In another embodiment, S1 102 may be configured to treat every called party number in the same way, such as by issuing an SRI query for every number, whether or not the called party number is a toll-free number.

The SRI query includes the toll-free number (TFN), also referred to as a "toll-free B-party" number, either as a parameter or stored in some field within the message. It can be seen that by extending the use of an SRI message, normally used to determine routing information for mobile called parties, as a means to also perform toll-free lookups, the S1 102 may avoid having to be provisioned to support additional protocols. Specifically, by issuing an SRI message, S1 102 may avoid having to support the intelligent network (IN) protocol and its derivatives, such as advanced intelligent network (AIN), wireless intelligent network (WIN), and others, or the customized applications for mobile networks enhanced logic (CAMEL) application part (CAP) protocol, for example.

Signaling node 106 receives the SRI query from S1 102. In one embodiment, signaling node 106 issues a TF query to TFDB 108 in response to determining that the called party number is a toll-free number. In an alternative embodiment, signaling node 106 may issue a TF query to TFDB 108 for every called party number without first determining whether it is a toll-free number. The TF query (FIG. 5A, message 2) and TF response (FIG. 5A, message 3) may be any of a variety of protocols, including WIN, INAP, and CAMEL. The TF response contains the translated DN associated with the TFN. TFSM 114 queries routing database 116, which returns an RN associated with the translated DN. Signaling node 106 then issues an SRI_ACK (FIG. 5A, message 4) to S1 102. The SRI_ACK includes both the RN and DN associated with the TFN.

Figure 5B:
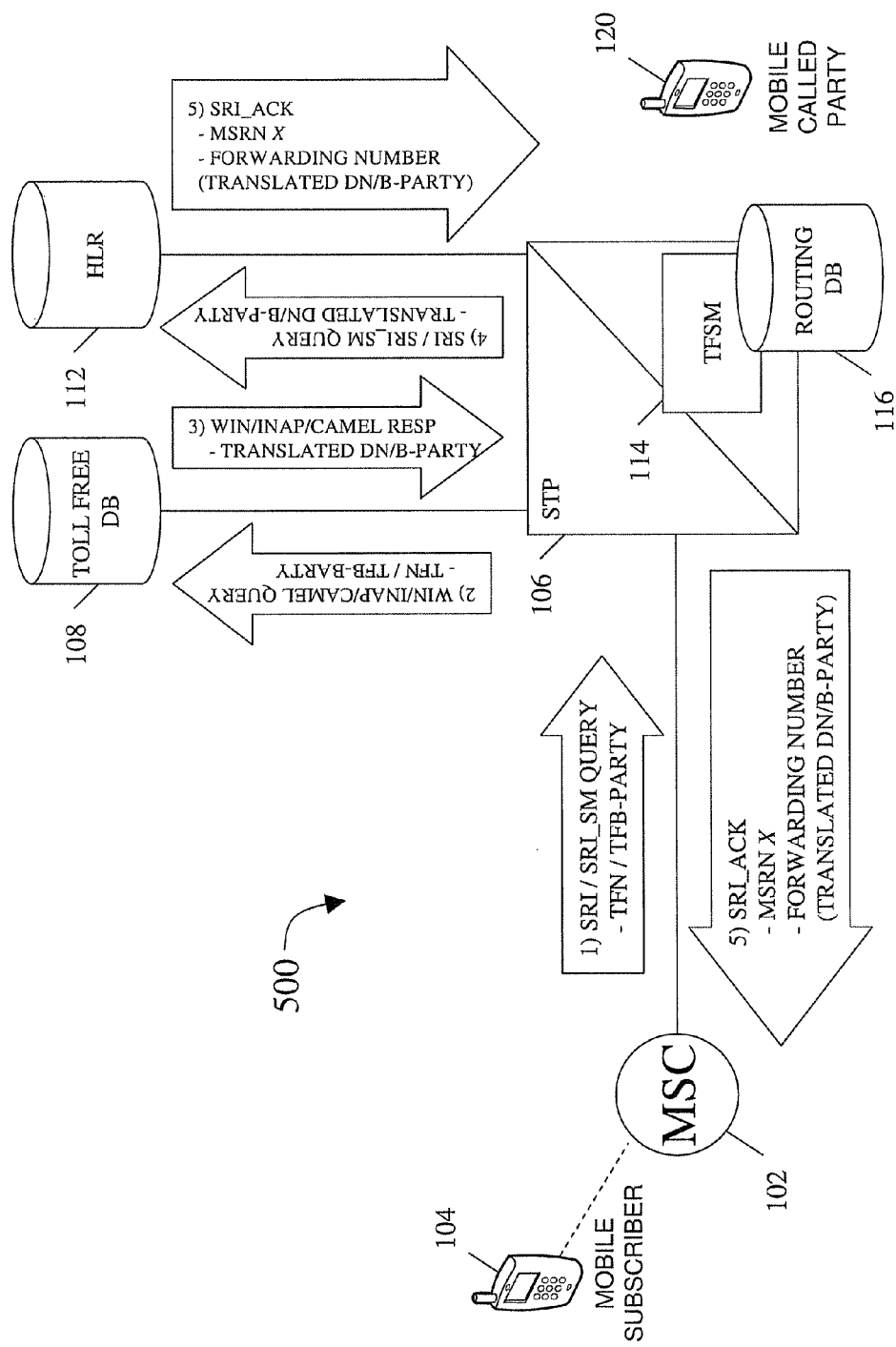
FIG. 5B is a block diagram illustrating an exemplary system for providing toll-free service in a telecommunications network according to another embodiment of the subject matter described herein, including exemplary signaling messages that may be generated during a mobile-to-mobile call setup in a network that does not support number portability.

FIG. 5B is a block diagram illustrating an exemplary system for providing toll-free service in a telecommunications network according to another embodiment of the subject matter described herein. FIG. 5B illustrates exemplary signaling messages that may be generated during a mobile-to-mobile call setup in a network that does not support number portability. Mobile subscriber 104 initiates a call to a toll-free called party number that is associated with mobile subscriber 120. In the embodiment illustrated in FIG. 5B, S1 102 has been configured to issue an SRI query (FIG. 5B, message 1) including the TFN in response to a determination that the called party number is a toll-free number. signaling node 106 receives the SRI query from S1 102 and engages in a toll-free query and response with TFDB 108 (FIG. 5B, messages 2 and 3). TFSM 114 determines that the translated DN returned by TFDB 108 belongs to a mobile subscriber, and thus queries HLR 112 to determine the current routing information for mobile called party 120 (FIG. 5B, message 4). HLR 112 returns the MSRN of the MSC currently serving mobile called party 120 (FIG. 5B, message 5). Signaling node 106 then issues an SRI_ACK (FIG. 5B, message 6) to S1 102. The SRI_ACK includes the MSRN and DN associated with toll-free mobile called party 120. S1 102 may then issue a call setup message to the MSC identified by its MSRN. Note that routing database 116 is not needed in this scenario, since HLR 112 provided the necessary routing information, which in this case was an MSRN.

Figure 5C:
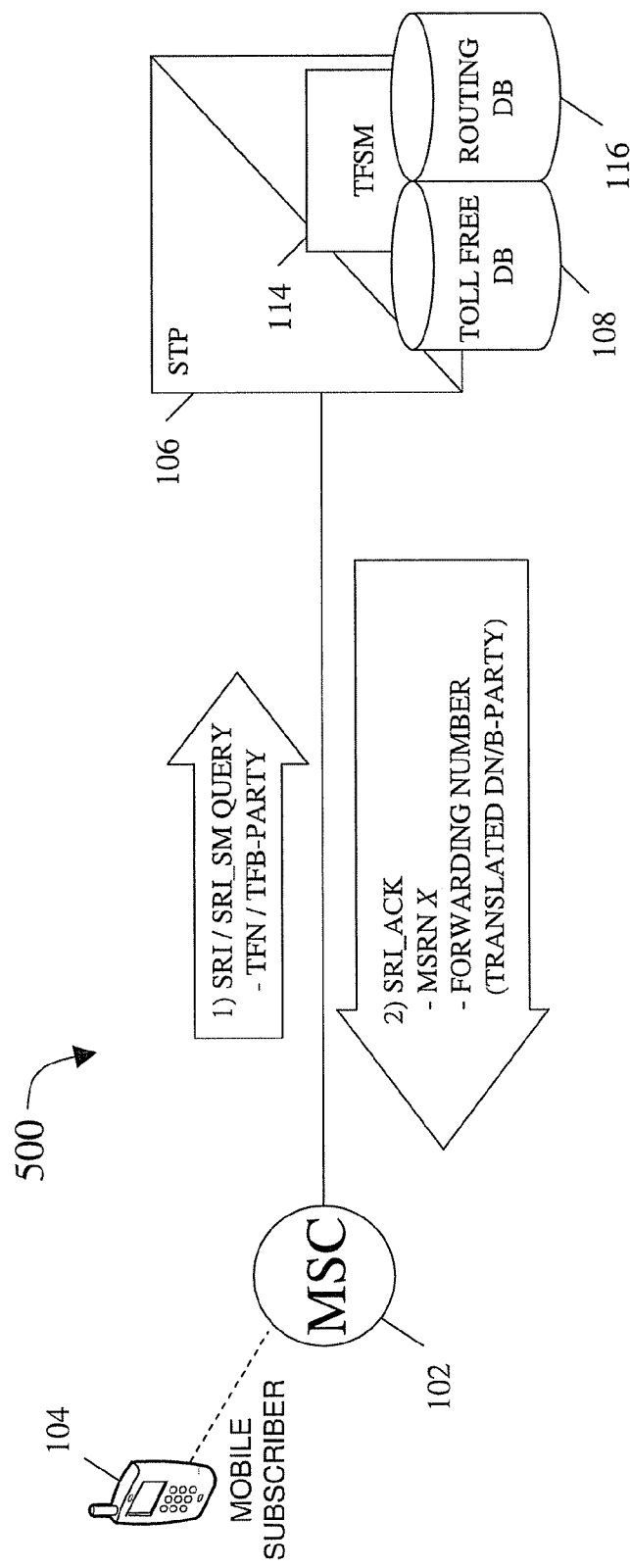
FIG. 5C is a block diagram illustrating an exemplary system for providing toll-free service in a telecommunications network according to another embodiment of the subject matter described herein, in which the toll-free database is a component within the signaling message routing node.

FIG. 5C is a block diagram illustrating an exemplary system for providing toll-free service in a telecommunications network according to another embodiment of the subject matter described herein. FIG. 5C illustrates an embodiment of network 500 in which toll-free database TFDB 108 is local to signaling node 106, rather than remote from signaling node 106 as shown in FIG. 5B.

Figure 5D:
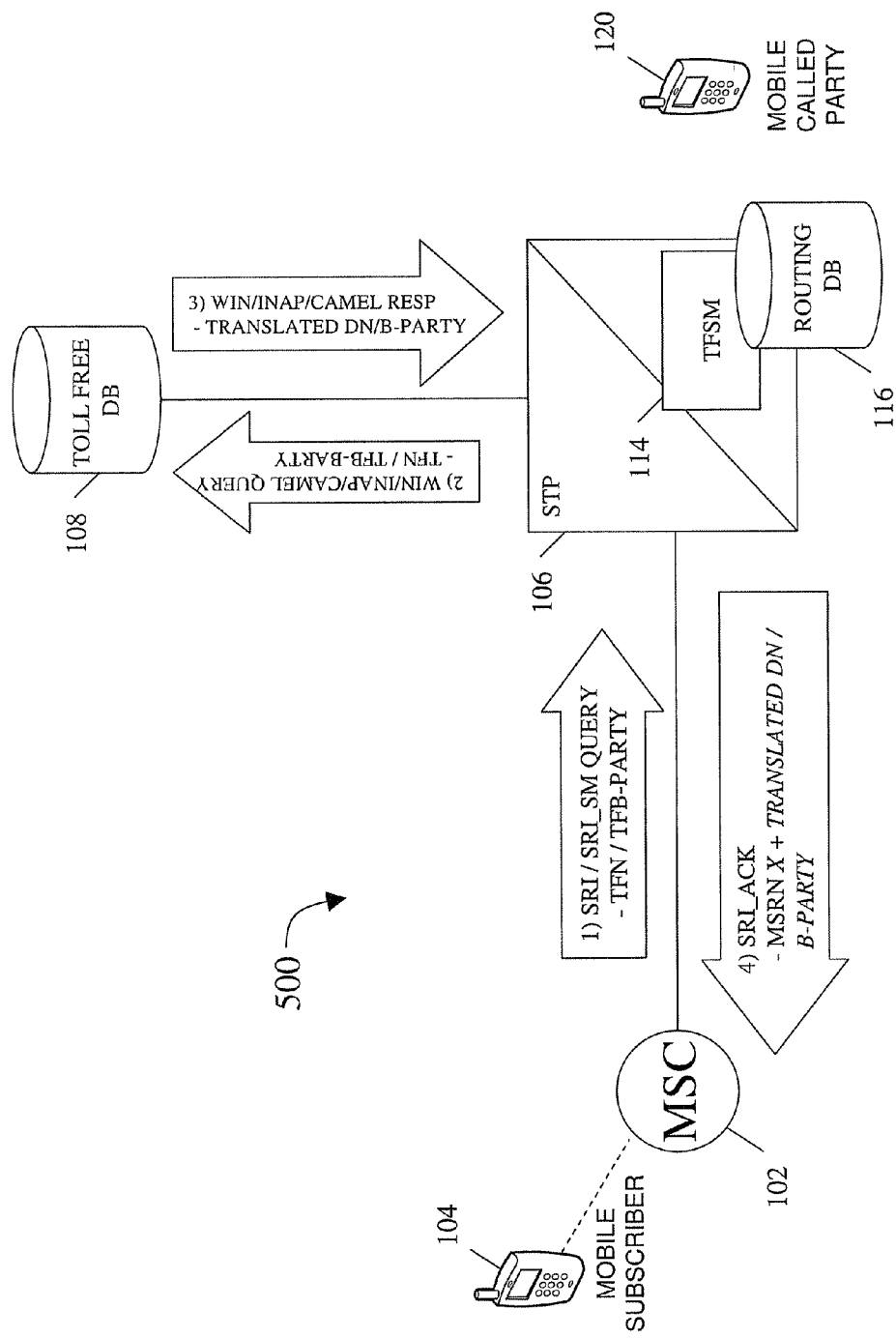
FIG. 5D is a block diagram illustrating an exemplary system for providing toll-free service in a telecommunications network according to another embodiment of the subject matter described herein, in which the directory number and routing information are concatenated together and returned in a single field or parameter.

FIG. 5D is a block diagram illustrating an exemplary system for providing toll-free service in a telecommunications network according to another embodiment of the subject matter described herein. FIG. 5D illustrates an embodiment of network 500 in which signaling node 106 returns the RN and DN data not as separate fields or parameters as shown in FIG. 5C, but concatenated together in a single field or parameter.

Figure 5E:
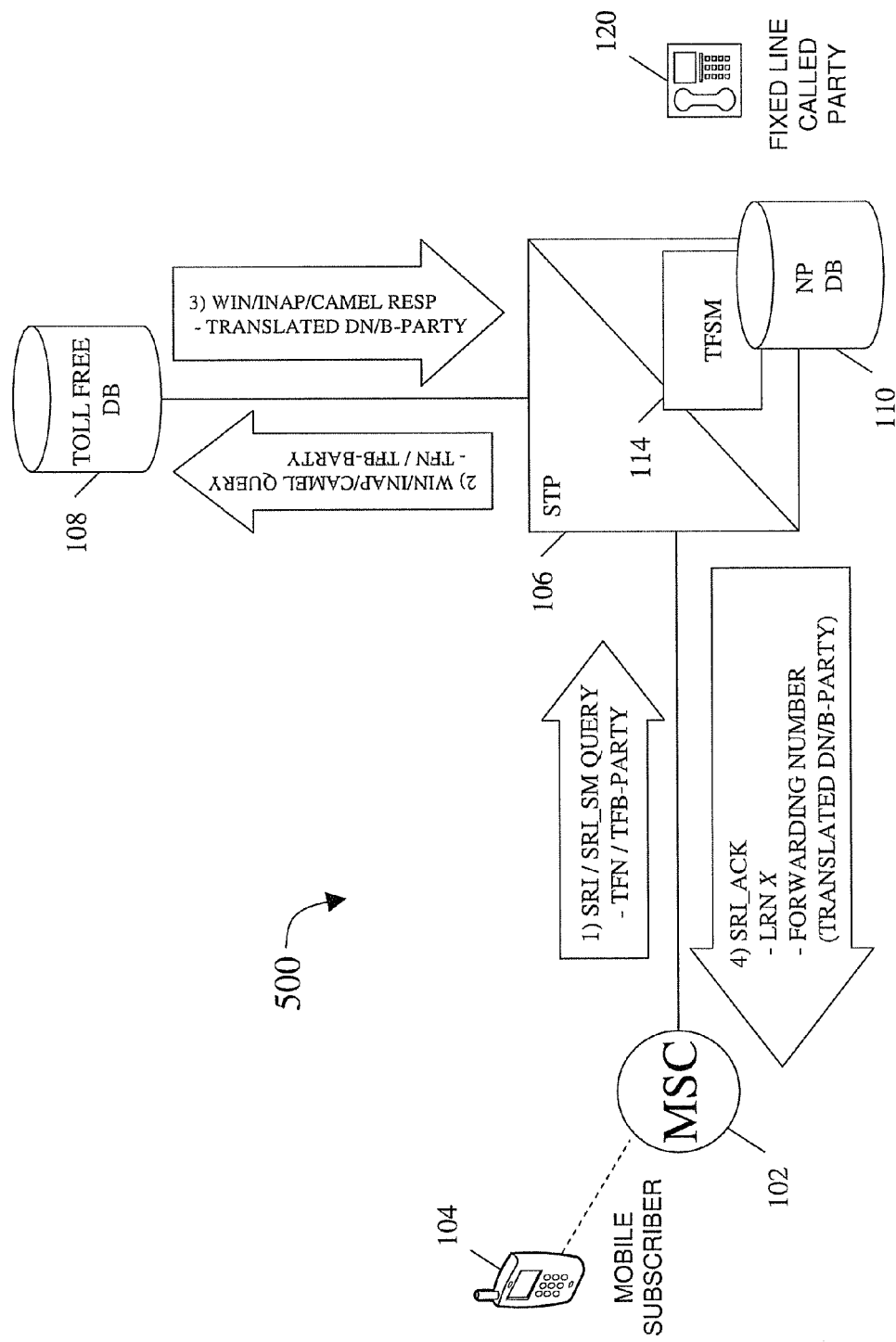
FIG. 5E is a block diagram illustrating an exemplary system for providing toll-free service in a telecommunications network according to another embodiment of the subject matter described herein, including exemplary signaling messages that may be generated during a mobile-to-wireline call setup in a network that supports number portability.

FIG. 5E is a block diagram illustrating an exemplary system for providing toll-free service in a telecommunications network according to another embodiment of the subject matter described herein. FIG. 5E illustrates exemplary signaling messages that may be generated during a mobile-to-wireline call setup in a network that supports number portability. The operation of the embodiment of network 500 illustrated in FIG. 5E is substantially identical to that illustrated in FIG. 5A, except that after the toll-free number TFN has been translated to a DN, TFSM 114 determines routing information for the DN by querying number portability database NPDB 110 rather than routing database 116. In one embodiment, TFSM 114 may perform an NP query only for DNs that have been identified as having been ported. In an alternative embodiment, TFSM 114 may perform an NP query for every DN, or even for every called party number detected.

Figure 5F:
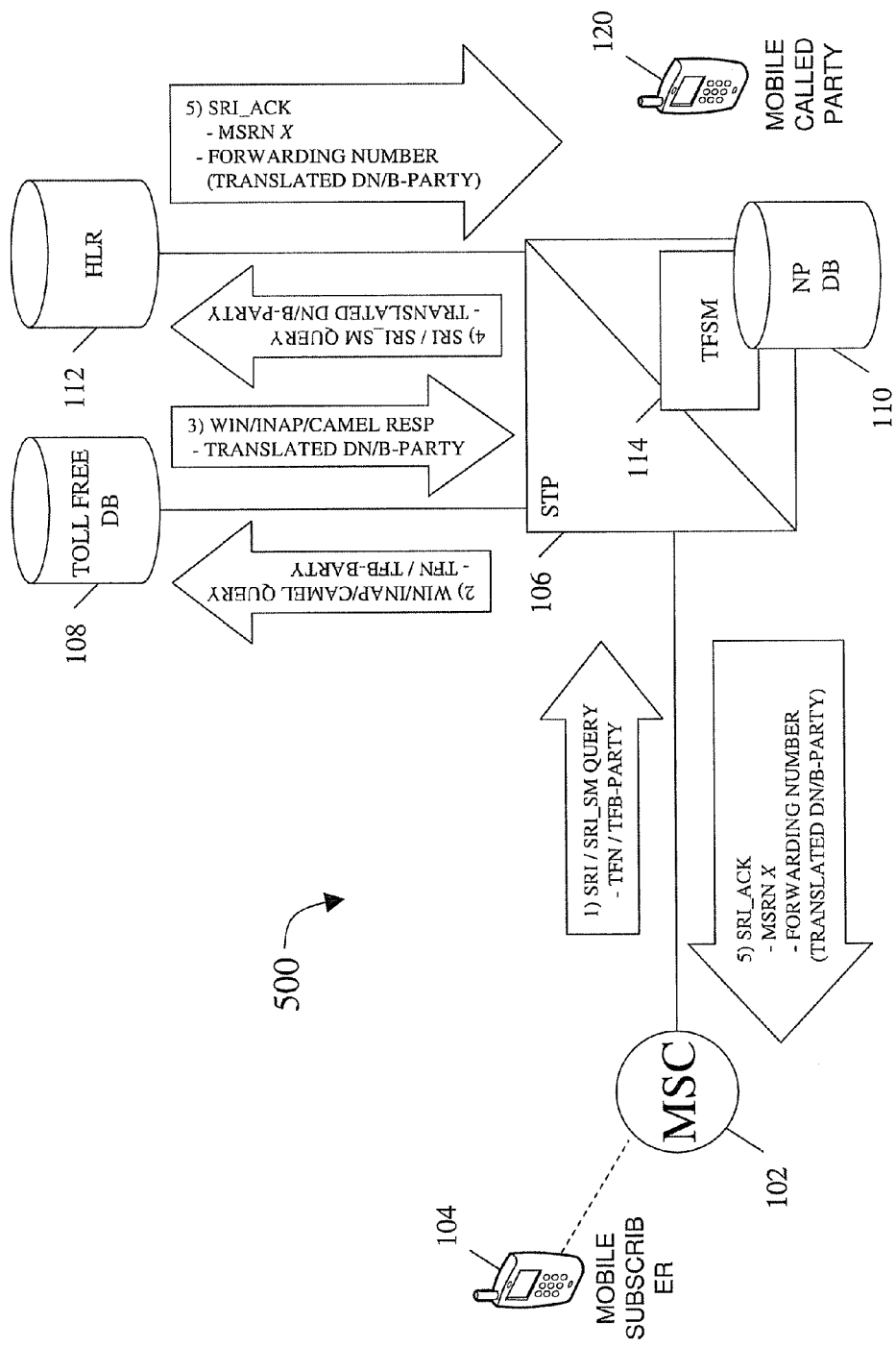
FIG. 5F is a block diagram illustrating an exemplary system for providing toll-free service in a telecommunications network according to another embodiment of the subject matter described herein, including exemplary signaling messages that may be generated during a mobile-to-mobile call setup in a network that supports number portability.

FIG. 5F is a block diagram illustrating an exemplary system for providing toll-free service in a telecommunications network according to another embodiment of the subject matter described herein. FIG. 5F illustrates exemplary signaling messages that may be generated during a mobile-to-mobile call setup in a network that supports number portability. The operation of the embodiment of network 500 illustrated in FIG. 5F is substantially identical to that illustrated in FIG. 5E, except that TFSM 114 may determine that the called party is a mobile subscriber, an thus engage in an SRI query and response with HLR 112 (FIG. 5E, messages 4 and 5). In one embodiment, if the toll-free called party DN has been ported, the routing number returned by NPDB 110 may be used to identify the network to which the toll-free called party 120 now belongs. This information may be used, for example, to determine which HLR 112 to query.

In an alternative embodiment, NPDB 110 may return the identity of the network to which toll-free called party 120 belongs, or the network address of a gateway to the network. In response, signaling node 106 may then modify the original SRI query (FIG. 5F, message 1, for example) to include the DN and RN information that it currently has, and forward the query to the network or network gateway node. In one embodiment, the SRI query may be processed by the network or some entity therein, which sends an response to the SRI query directly to S1 102. The SRI response may or may not be routed through signaling node 106 on its way back to MSC 102.

FIG. 6 is a block diagram illustrating an exemplary system for providing toll-free service in a telecommunications network according to another embodiment of the subject matter described herein. FIG. 6 illustrates exemplary signaling messages that may be generated in a system for providing toll-free service according to another embodiment of the subject matter described herein. FIG. 6 illustrates an implementation of toll-free service in which the identity of the switch that is serving the calling mobile subscriber is provided as part of the toll-free number lookup, to assist selection of an appropriate directory number based on the location of the calling party, herein referred to as calling-party-location sensitive toll-free translation. Telecommunications network 600 includes a switch S1 102, such as an MSC, via which a subscriber, such as mobile subscriber 104, accesses network 600. In the embodiment illustrated in FIG. 6, network 600 has a signaling node 106; a toll-free database TFDB 108 for mapping a toll-free number associated with called party 120 to a directory number; a toll-free service module 114; and a routing database 116. Unless otherwise noted, the functions of elements 102, 104, 106, 108, 114, 116, and 120 are substantially identical to the like-numbered elements in FIG. 2, and therefore their descriptions will not be repeated herein.

In FIG. 6, S1 102 has been configured to issue an SRI query (FIG. 6, message 1) to signaling node 106 whenever a called party number is identified as being a toll-free number. In one embodiment, S1 102 has also been configured to provide, as part of the SRI query, information identifying itself. The information could be, for example, an origination point code (OPC), an SCCP calling party address, a MAP-layer MSC_ID, a MAP-layer VLR_ID, an MSC entity address, or other identifying information. In one embodiment, Because MSCs in general are not mobile, the identity of the MSC can be used to provide an indication of the geographic location of the calling party, mobile subscriber 104. This geographic location information could be used, for example, by a company with a business presence in several different geographic areas. Such a company may desire to provide a single toll-free number, which, when called, will connect the calling party to the office or representative geographically closest to the calling party. For example, a caller on the east coast may be connected to an east coast office while a caller on the west coast may be connected to a west coast office. Similarly, a caller of a world-wide toll-free number may be connected to the office in the appropriate continent or county.

In one embodiment, if the originating switch identity information extracted from the SRI is formatted as a telephone number, e.g., (919) 342-9585, where the area code prefix provides sufficient location information, then signaling node 106 may include at least a portion of this originating switch identity information in the toll-free database query (FIG. 6, message 2), thereby providing TFDB 108 with sufficient calling party location information to perform a calling location-sensitive toll-free translation.

Table 3, below, shows an example of a toll-free database configured to return a directory number based on the geographic location of the calling party, as derived from the area code of the calling party. In one embodiment, a caller of the toll-free number "1-800-TEKELEC" (1-800-835-3532) will be connected to one of several different directory numbers, depending on the calling party's area code. In this example, callers from the west coast of the United States, such as callers from area codes 415 and 630, will be connected to the Illinois office at (630) 268-2524, while callers from the east coast, such as callers from area codes 704 and 919, will be connected to the North Carolina office at (919) 460-5500.

TABLE 3

Calling-party-location-based TF translation

| TFN | Area code of calling party | Directory Number |
|---|---|---|
| 8008353532 | 212 | (630) 268-2524 |
| 8008353532 | 630 | (630) 268-2524 |
| 8008353532 | 704 | (919) 460-5500 |
| 8008353532 | 919 | (919) 460-5500 |
| 8008353532 | . | . |
|  | . | . |
|  | . | . |

If the originating switch identity information is in one form, such as an origination point code (OPC), but the toll-free database is keyed to another form, such as the area code used in Table 3, above, another translation may be required, to map the OPC of S1 102 to an area code or other information that TFDB 108 can understand. In one embodiment, signaling node 106 may extract an SS7 origination point code (OPC) network address value from the SRI message, and map the OPC to a switch identity/entity address or "dummy" telephone number associated with the switch originating the SRI. This switch entity address or telephone number is then included in the toll-free query. In this scenario, a calling party mapping database 602 may be provided for mapping an origination point code of the originating switch to a directory number or routing number which is then passed to TFDB 108 as party of the toll-free query. An example of such a calling party mapping database is shown in Table 4, below.

TABLE 4

| Calling Party Mapping DB | |
|---|---|
| Origination Point Code | Toll-Free Calling Party ID |
| 1-2-1 | 9194690000 |
| 2-4-3 | 2124580000 |
| . | . |
| . | . |
| . | . |

Referring again to FIG. 6, mobile subscriber 104 calls the toll-free number associated with toll-free mobile called party 120. In the embodiment illustrated in FIG. 6, mobile subscriber 104 has a mobile telephone number (919) 555-5555 and MSC 102 has a point code of 2-4-3. MSC 102 determines that the called party number is a toll-free number, and, in response, sends an SRI query including the MSC identifier, point code 2-4-3 (FIG. 6, message 1) to signaling node 106.

TFSM 114 determines that the SRI query includes a toll-free number, and, in response, issues a toll-free query (FIG. 6, message 2) to TFDB 108. The toll-free query includes MSC point code 2-4-3 along with the toll-free called party number. TFDB 108 first determines the toll-free calling party ID by mapping the OPC of MSC 102 to a directory number, calling party mapping DB 602, the contents of which are shown in Table 4, above, which returns a calling party ID of "2124580000". TFDB 108 then uses the calling party ID returned by calling party mapped DB 602 and includes that as the MSC identifier in a toll-free query (FIG. 6, message 2) to TFDB 108. TFDB 108 then uses the first three digits of the MSC ID, i.e., "212", along with the toll-free called party number, i.e., "8008353532", to determine the translated directory number for toll-free called party, by using Table 3, above. In this example, TFDB 108 will return directory number "6302682524" to TFSM 114 (FIG. 6, message 3). TFSM 108 will determine a routing number associated with the translated directory number by using, for example, any of the methods described above. Signaling node 106 will then send an SRI_ACK containing the routing number associated with the translated directory number (FIG. 6, message 4) to MSC 102. It is important to note that had TFDB 108 used the mobile subscriber's directory number "9195555555" instead of the MSC ID, TFDB 108 would have returned "9194605500" as the directory number for the toll-free called party. In this case, mobile subscriber 104 would not have been connected to the called party number geographically closest to mobile subscriber 104.

The techniques described above for obtaining and providing calling party or calling switch information can be applied to all of the other embodiments of the present invention.

FIGS. 7A-7C each include a block diagram illustrating an exemplary system for providing toll-free service according to another embodiment of the subject matter described herein. FIGS. 7A-7C illustrate the use of a number portability (NP) query to provide toll-free service. In each of FIGS. 7A-7C, telecommunications network 700 includes: a switch, such as end office (EO) 102, via which a subscriber, such as fixed line subscriber 104, accesses network 700; a signaling node 106, which includes a toll-free service module (TFSM) 114; a toll-free database (TFDB) 108 for mapping a toll-free number associated with called party 120 to a directory number; and a number portability database NPDB 110. Unless otherwise noted, the functions of elements 102, 104, 106, 108, 110, 114, and 120 are substantially identical to the like-numbered elements in FIG. 2, and therefore their descriptions will not be repeated herein.

FIG. 7A is a block diagram illustrating an exemplary system for providing toll-free service in a telecommunications network according to another embodiment of the subject matter described herein. FIG. 7A illustrates exemplary signaling messages that may be generated during a wireline-to-wireline call setup in a network in which supports number portability. In the embodiment illustrated in FIG. 7A, calling party 104 is a wireline subscriber, and originating switch 102 is an end office (EO) that has been configured to issue NP queries whenever it determines that the called party number is a toll-free number.

Calling party 104 dials a toll-free number associated with called party 120, which in this example is a wireline subscriber. EO 102 determines that the called party number is a toll-free number, and, in response, issues an NP query including the toll-free number, TFN, to signaling node 106 (FIG. 7A, message 1). In one embodiment, signaling node 106 has been configured to determine whether an incoming NP query includes a toll-free number, and if so, to direct the query to TFSM 114. Upon receiving the NP query from EO 102, TFSM 114 determines that the called party is a toll-free number and issues a TF query to TFDB 108 (FIG. 7A, message 2). TFDB 108 translates the toll-free number contained in the query, TFN, to a directory number (DN), and returns the translated DN to signaling node 106 (FIG. 7A, message 3). TFSM 114 receives the DN and performs a number portability query using NPDB 110, which returns routing information, such as a location routing number (LRN), to TFSM 114. Signaling node 106 then sends the routing information back to EO 102 as an NP response (FIG. 7A, message 4). In alternative embodiments, calling party 104 may be a mobile subscriber and S1 102 may be a MSC.

FIG. 7B is a block diagram illustrating an exemplary system for providing toll-free service in a telecommunications network according to another embodiment of the subject matter described herein. FIG. 7B illustrates an embodiment of network 700 which is substantially identical to the embodiment illustrated in FIG. 7A, except that in FIG. 7B, NPDB 110 is located remotely from signaling node 106. In contrast, in FIG. 7A, NPDB 110 is a component within signaling node 106. In the embodiment illustrated in 7B, TFSM 114 or signaling node 106 may perform the NP query with NPDB 110 (FIG. 7A, messages 4 and 5) using one or more of the protocols discussed above. In one embodiment, NPDB 110 may issue an NP response that includes a routing number. In an alternative embodiment, the NP response from NPDB 110 may include the directory number that was used in the query, i.e., the translated DN, as well as the routing number.

FIG. 7C is a block diagram illustrating an exemplary system for providing toll-free service in a telecommunications network according to another embodiment of the subject matter described herein. FIG. 7C illustrates an embodiment of network 700 which is substantially identical to the embodiment illustrated in FIG. 7A, except that in FIG. 7C, both TFDB 108 and NPDB 110 are local to signaling node 106. From the viewpoint of EO 102, the embodiments of signaling node 106 illustrated in FIGS. 7A, 7B, and 7C have identical behavior: EO 102 issues an NP query containing a toll-free called party number, and signaling node 106 responds with routing information and optionally with the translated DN as well.

Figure 8A:
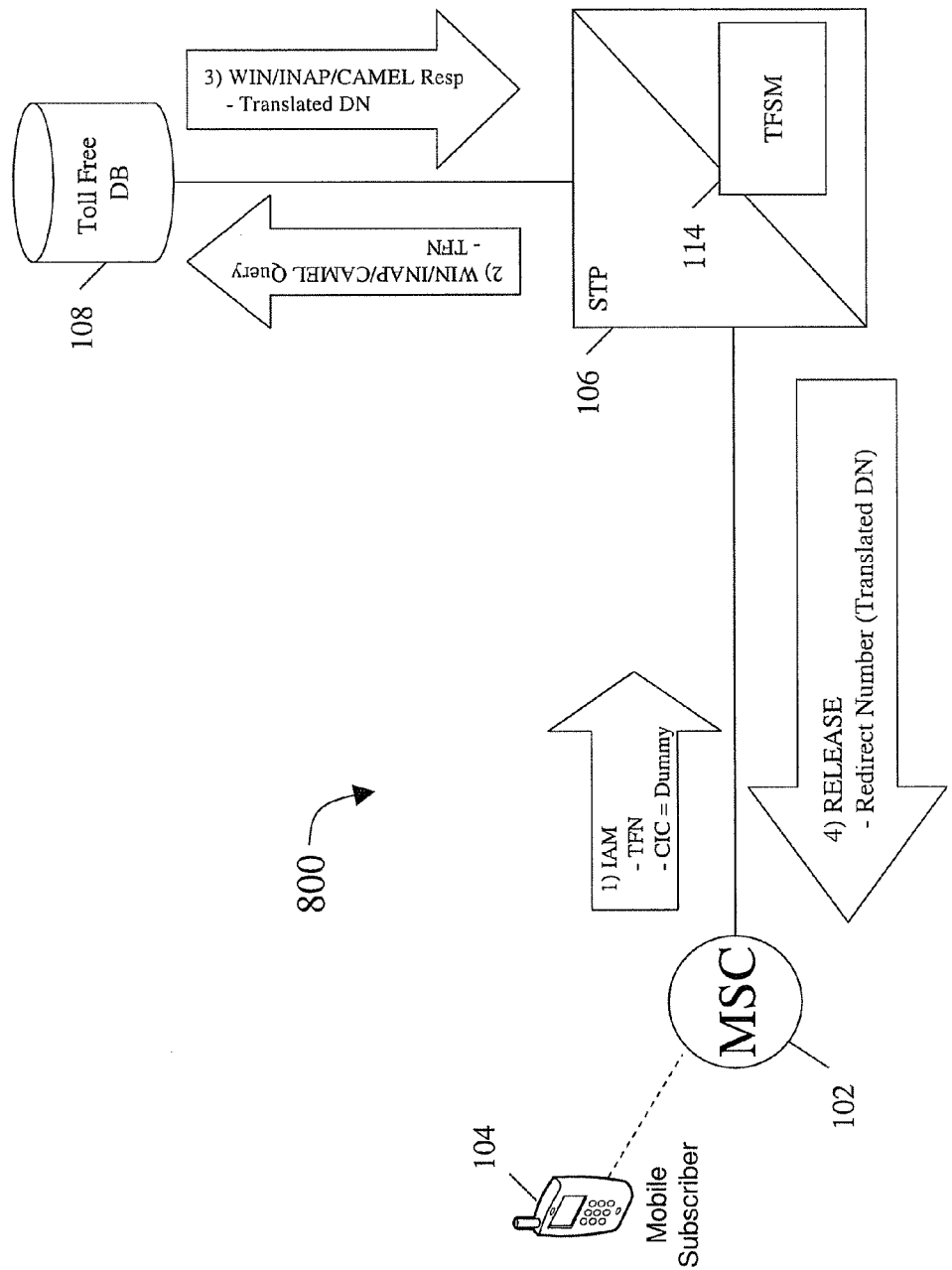
FIG. 8A is a block diagram illustrating an exemplary system for providing triggerless toll-free service with release in a telecommunications network according to another embodiment of the subject matter described herein, including exemplary signaling messages that may be generated during a mobile-originated call setup.
Figure 8B:
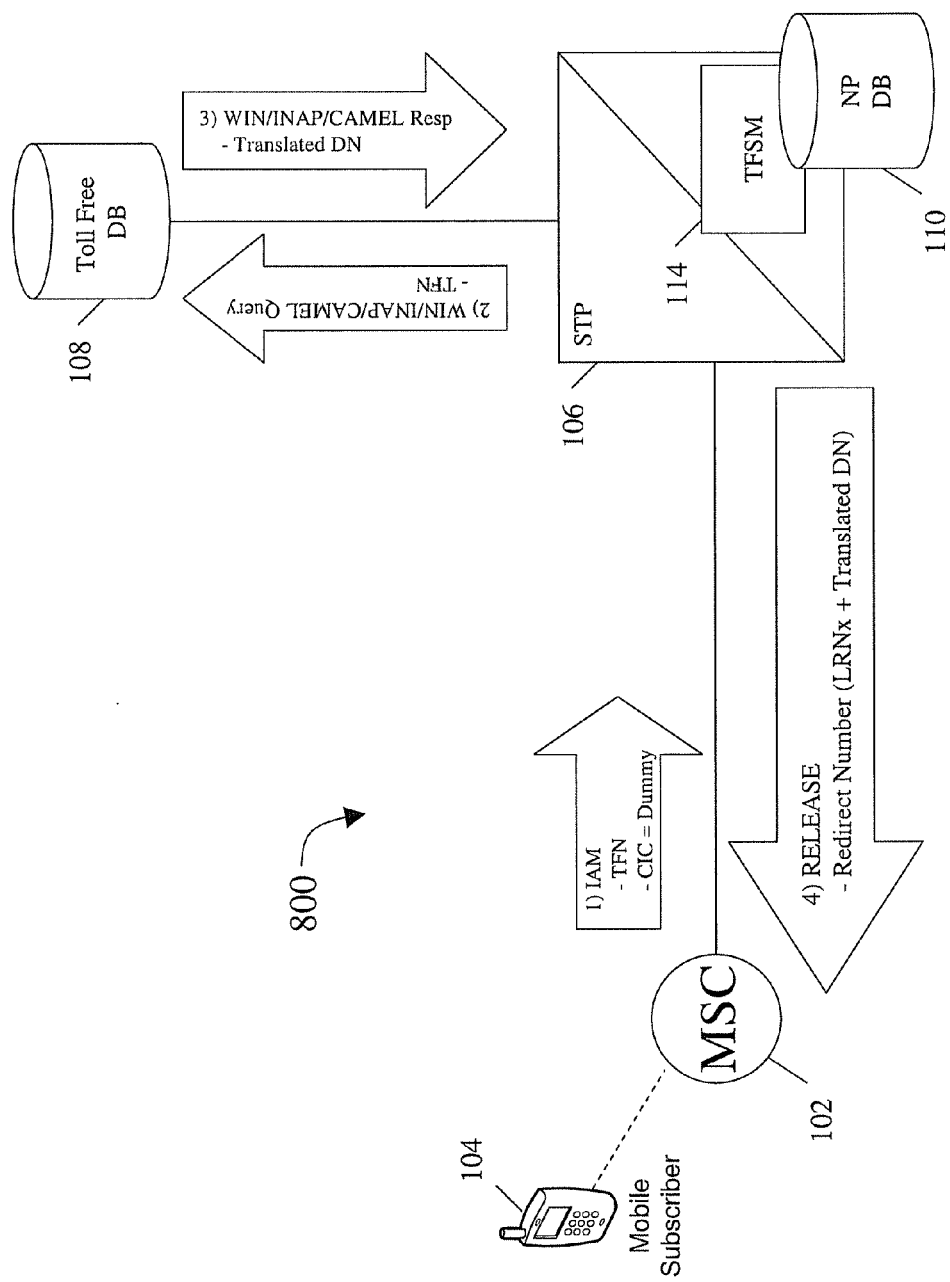
FIG. 8B is a block diagram illustrating an exemplary system for providing triggerless toll-free service with release in a telecommunications network according to another embodiment of the subject matter described herein, where the network supports number portability.
Figure 8C:
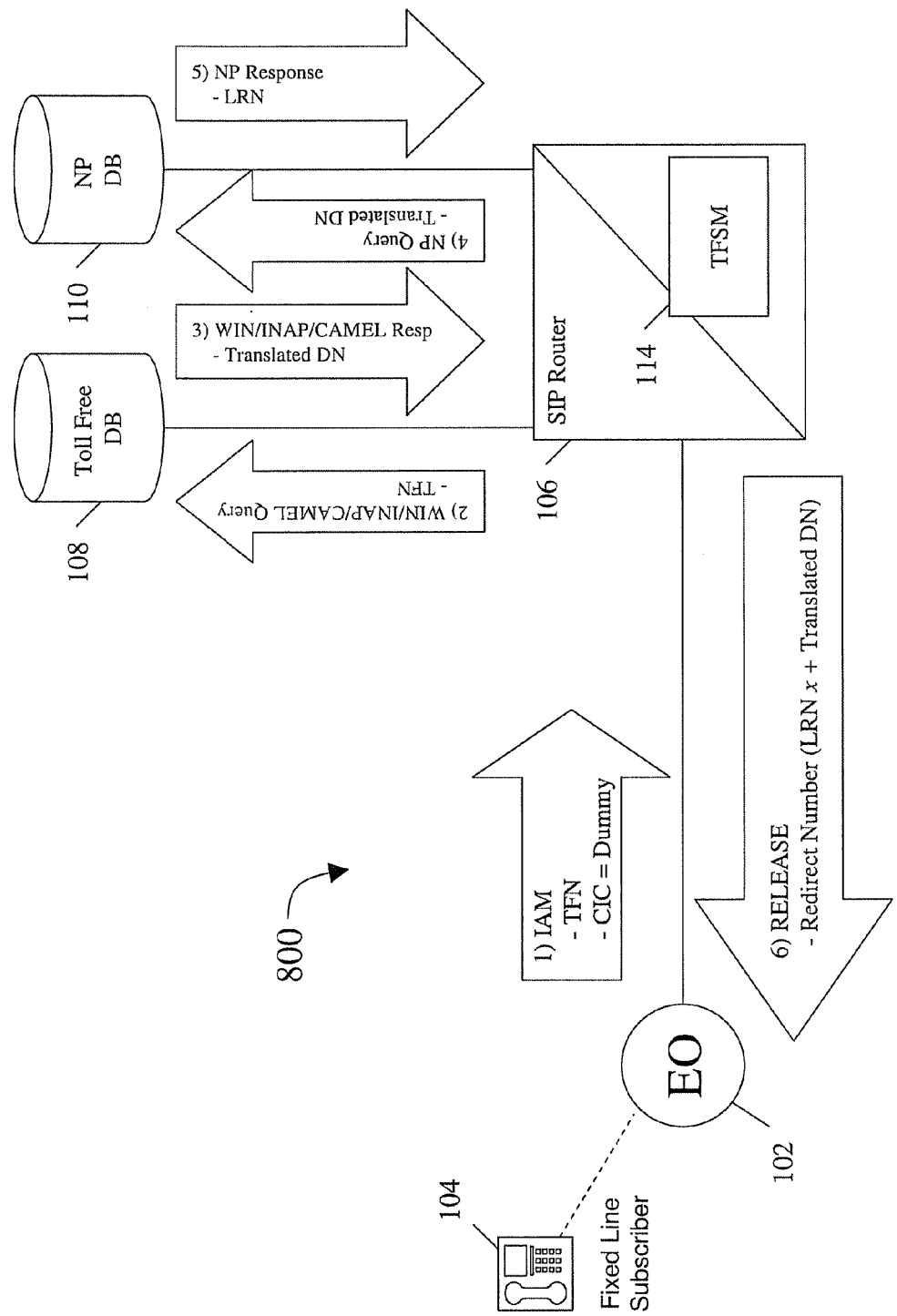
FIG. 8C is a block diagram illustrating an exemplary system for providing triggerless toll-free service with release in a telecommunications network according to another embodiment of the subject matter described herein, where the number portability database is located remotely from the signaling message routing node.

FIGS. 8A-8C each include a block diagram illustrating an exemplary system for providing toll-free service according to another embodiment of the subject matter described herein. FIGS. 8A-8C illustrate a triggerless implementation of toll-free service, with release. In each of FIGS. 8A-8C, telecommunications network 800 includes: a switch 102, such as an end office (EO), a service switching point (SSP), or MSC, via which a fixed line or mobile subscriber 104 accesses network 800; a signaling message routing node, signaling node 106, which includes a toll-free service module (TFSM) 114; and a toll-free database (TFDB) 108 for mapping a toll-free number associated with called party 120 (not shown) to a directory number. FIGS. 8B and 8C also include a number portability database NPDB 110. Unless otherwise noted, the functions of elements 102, 104, 106, 108, 110, and 114 are substantially identical to the like-numbered elements in FIG. 2, and therefore their descriptions will not be repeated herein.

FIG. 8A is a block diagram illustrating an exemplary system for providing triggerless toll-free service in a telecommunications network according to another embodiment of the subject matter described herein. FIG. 8A illustrates exemplary signaling messages that may be generated during a mobile-originated call setup. In one embodiment, an originating switch, such as MSC 102, sends a call setup message (FIG. 8A, message 1). Example call setup messages include ISUP IAM, ISUP SAM, and BICC messages. The call setup message includes called party information and may include information identifying a bearer circuit, such as a circuit identification code (CIC), which provides information about where the voice part of the call is carried, e.g., on which trunk and in which timeslot.

The call setup message is intercepted by a signaling message processing node, such as signaling node 106. In response to determining that a called party number within the intercepted call setup message, TFSM 114 issues a toll-free query (FIG. 8A, message 2) to TFDB 108 and receives from TFDB 108 a response that includes a translated DN (FIG. 8A, message 3).

In the embodiment illustrated in FIG. 8A, network MSC 102 is configured to determine whether the called party number is a toll-free number, and if so, to reserve a dummy circuit. In this embodiment, TFSM 114 may always issue a release message (FIG. 8A, message 4) to MSC 102, the release message including the translated DN. In this embodiment, MSC 102 receives the translated DN from signaling node 106 and issues a second call setup message based on the translated DN. For example, MSC 102 may receive the translated DN and perform a routing query based on the translated DN, receive routing information, such as a routing number (RN), and include the RN in the second call setup message. Alternatively, MSC 102 may determine that the translated DN is for a mobile subscriber and issue an SRI request to an HLR, receive an MSRN, and send the second call setup request to the switch identified by the MSRN, and so on.

In an alternative embodiment, MSC 102 may route to a default destination switch and reserve an actual (i.e., not dummy) circuit to the target destination. In one embodiment, signaling node 106 intercepts the call setup message (FIG. 8A, message 1), performs the TF query (FIG. 8A, messages 2 and 3), and determines, based on the translated DN, whether the reserved bearer circuit was the correct one. If so, signaling node 106 may opt not to issue the release message (FIG. 8A, message 4), but instead simply forward the call setup message to the next node in the path. (This scenario is described in more detail with regards to FIG. 9A, below.)

FIG. 8B is a block diagram illustrating an exemplary system for providing triggerless toll-free service in a telecommunications network according to another embodiment of the subject matter described herein. FIG. 8B illustrates an embodiment of network 800 which is substantially identical to the embodiment illustrated in FIG. 8A, except that in FIG. 8B, network 800 supports number portability. In this embodiment, in addition to intercepting the call setup message and issuing a toll-free query, signaling node 106 may also perform a NP query using NPDB 110 to determine routing information, which is also included in the release message (FIG. 4B, message 4) sent to MSC 102.

FIG. 8C is a block diagram illustrating an exemplary system for providing triggerless toll-free service in a telecommunications network according to another embodiment of the subject matter described herein. FIG. 8C illustrates an embodiment of network 800 which is substantially identical to the embodiment illustrated in FIG. 8B, except that in FIG. 8C, number portability database NPDB 110 is located remotely from signaling message routing node 106. FIG. 8C also illustrates an embodiment in which signaling message routing node 106 is a SIP router.

FIGS. 9A-9D each include a block diagram illustrating an exemplary system for providing toll-free service according to another embodiment of the subject matter described herein. FIGS. 9A-9D illustrate a triggerless implementation of toll-free service, without release. In each of FIGS. 9A-9D, telecommunications network 900 includes: a switch 102, such as an end office (EO), a service switching point (SSP), or MSC, via which a fixed line or mobile subscriber 104 accesses network 900; a signaling message routing node, signaling node 106, which includes a toll-free service module (TFSM) 114; a toll-free database (TFDB) 108 for mapping a toll-free number associated with called party 120 (not shown) to a directory number; and one or more databases, such as number portability database NPDB 110, HLR 112, or routing database 116, for determining a routing number to a terminating switch (S2) 118, which may be an SSP, an MSC, or a tandem office (TO). Unless otherwise noted, the functions of elements 102, 104, 106, 108, 110, 112, 114, 116, and 118 are substantially identical to the like-numbered elements in FIG. 2, and therefore their descriptions will not be repeated herein.

Figure 9A:
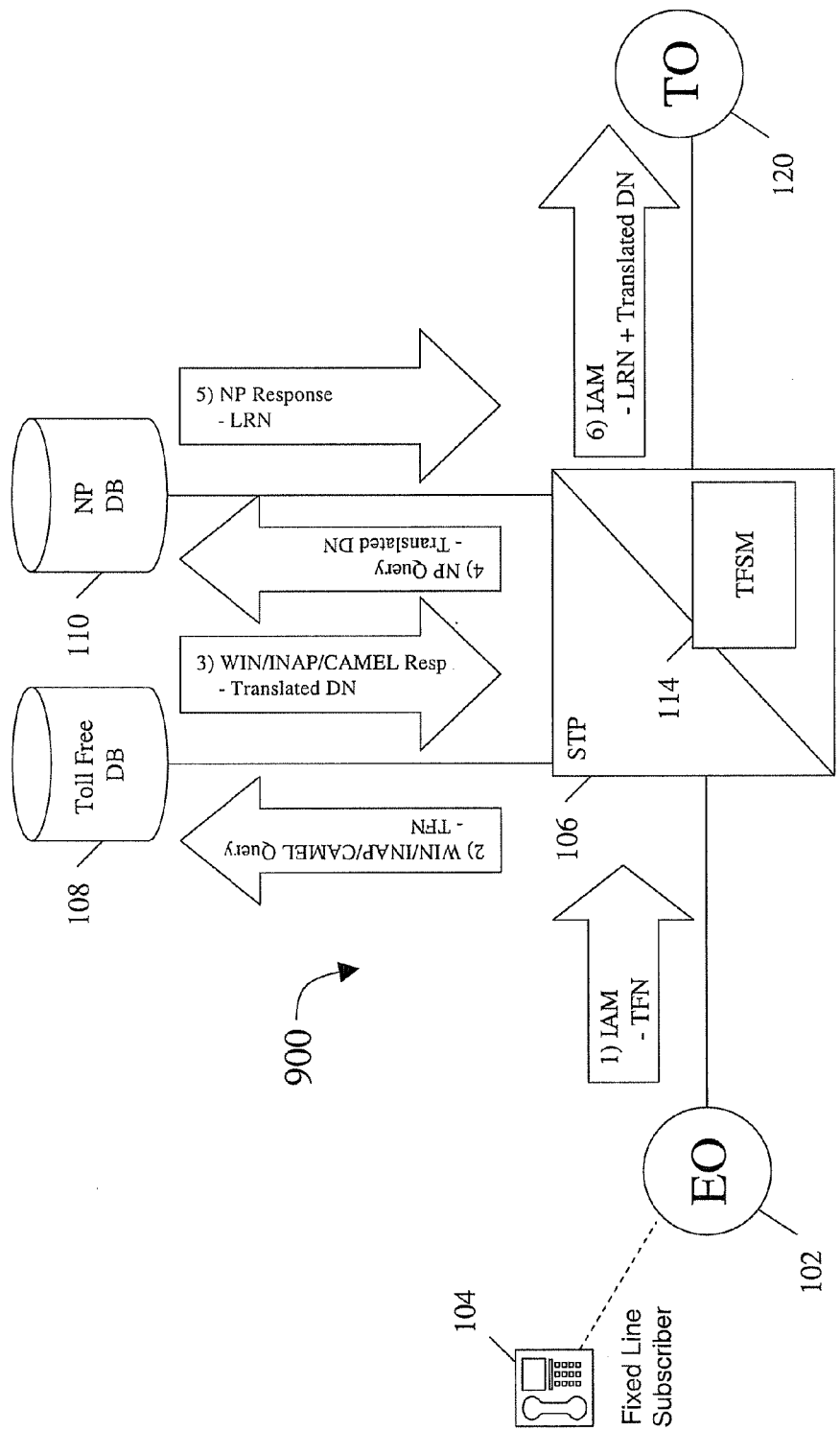
FIG. 9A is a block diagram illustrating an exemplary system for providing triggerless toll-free service in a telecommunications network according to another embodiment of the subject matter described herein, including exemplary signaling messages that may be generated in a system that supports number portability.

FIG. 9A is a block diagram illustrating an exemplary system for providing triggerless toll-free service in a telecommunications network according to another embodiment of the subject matter described herein. FIG. 9A illustrates exemplary signaling messages that may be generated in a system that implements triggerless toll-free service and that supports number portability. In one embodiment, end office 102 sends a call setup message, such as an ISUP IAM, ISUP SAM, or BICC message, the message including the toll-free number of the called party. Signaling node 106 intercepts the call setup message (FIG. 9A, message 1), determines that the call setup message includes a toll-free called party number, and passes the message to TFSM 114. TFSM 114 queries TFDB 108 (FIG. 9A, message 2) using the toll-free called party number TFN. TFDB 108 returns the translated DN (FIG. 9A, message 3). TFSM 114 queries NPDB 110 (FIG. 9A, message 4) using the translated DN. NPDB 110 returns a location routing number LRN (FIG. 9A, message 5). TFSM 114 sends a call setup message including the translated DN and LRN (FIG. 9A, message 6) to S2 118.

Figure 9B:
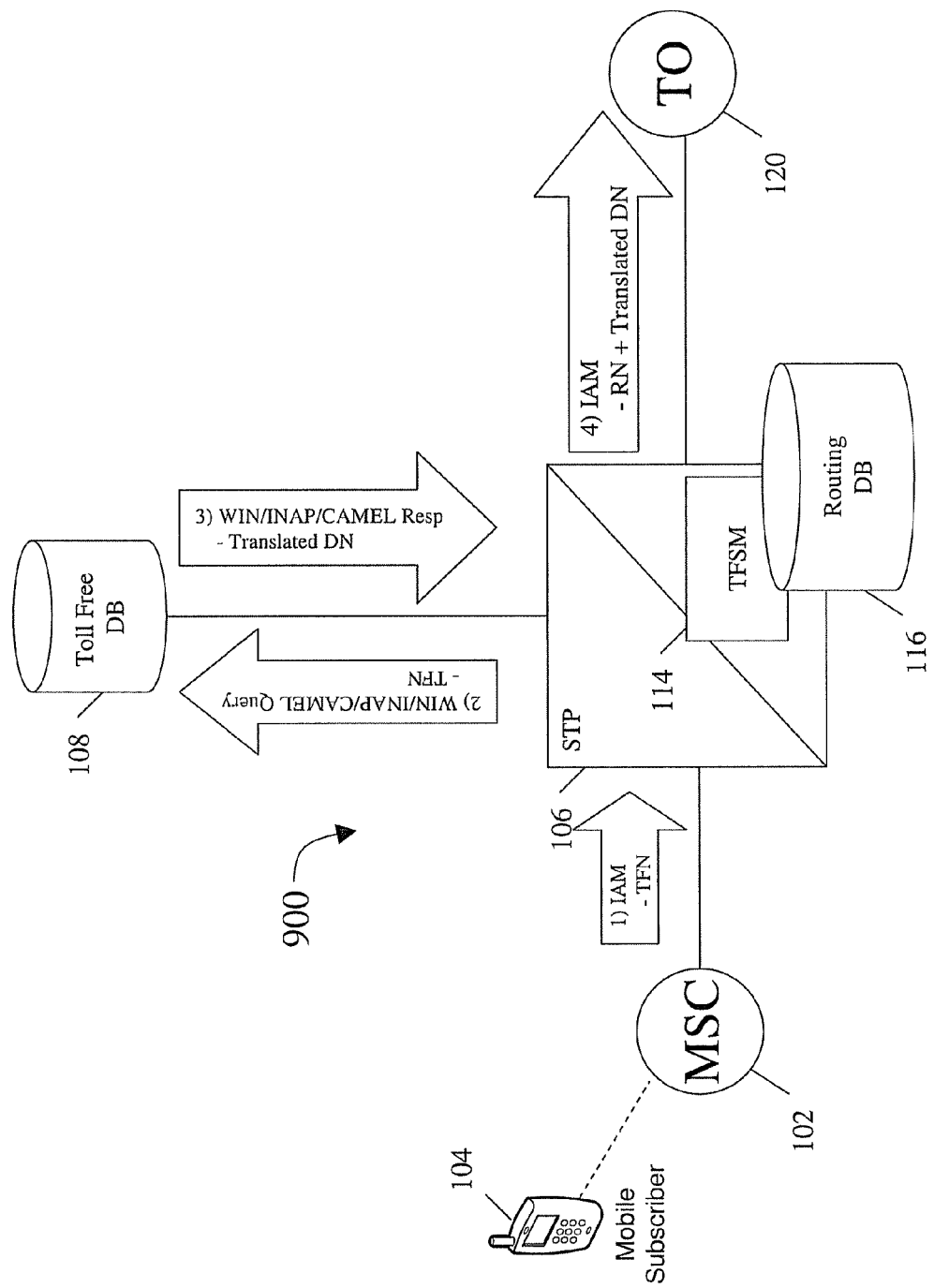
FIG. 9B is a block diagram illustrating an exemplary system for providing triggerless toll-free service in a telecommunications network according to another embodiment of the subject matter described herein, including exemplary signaling messages that may be generated in a system that does not support number portability.

FIG. 9B is a block diagram illustrating an exemplary system for providing triggerless toll-free service in a telecommunications network according to another embodiment of the subject matter described herein. FIG. 9B illustrates exemplary signaling messages that may be generated in a system that implements triggerless toll-free service but does not support number portability. FIG. 9B, messages 1-3 may be substantially the same as for the embodiment illustrated in FIG. 9A. However, in the embodiment illustrated in FIG. 9B, upon receipt of the translated DN from TFDB 108, TFSM 114 does not yet have routing information for the call, and so may query routing DB 116 to determine a routing number RN associated with the translated DN. TFSM 114 may forward the call setup message, now including the translated DN and RN, to S2 118 (FIG. 9B, message 4). In alternative embodiments, a routing number may be determined for the translated DN by other means, such as those described above.

Figure 9C:
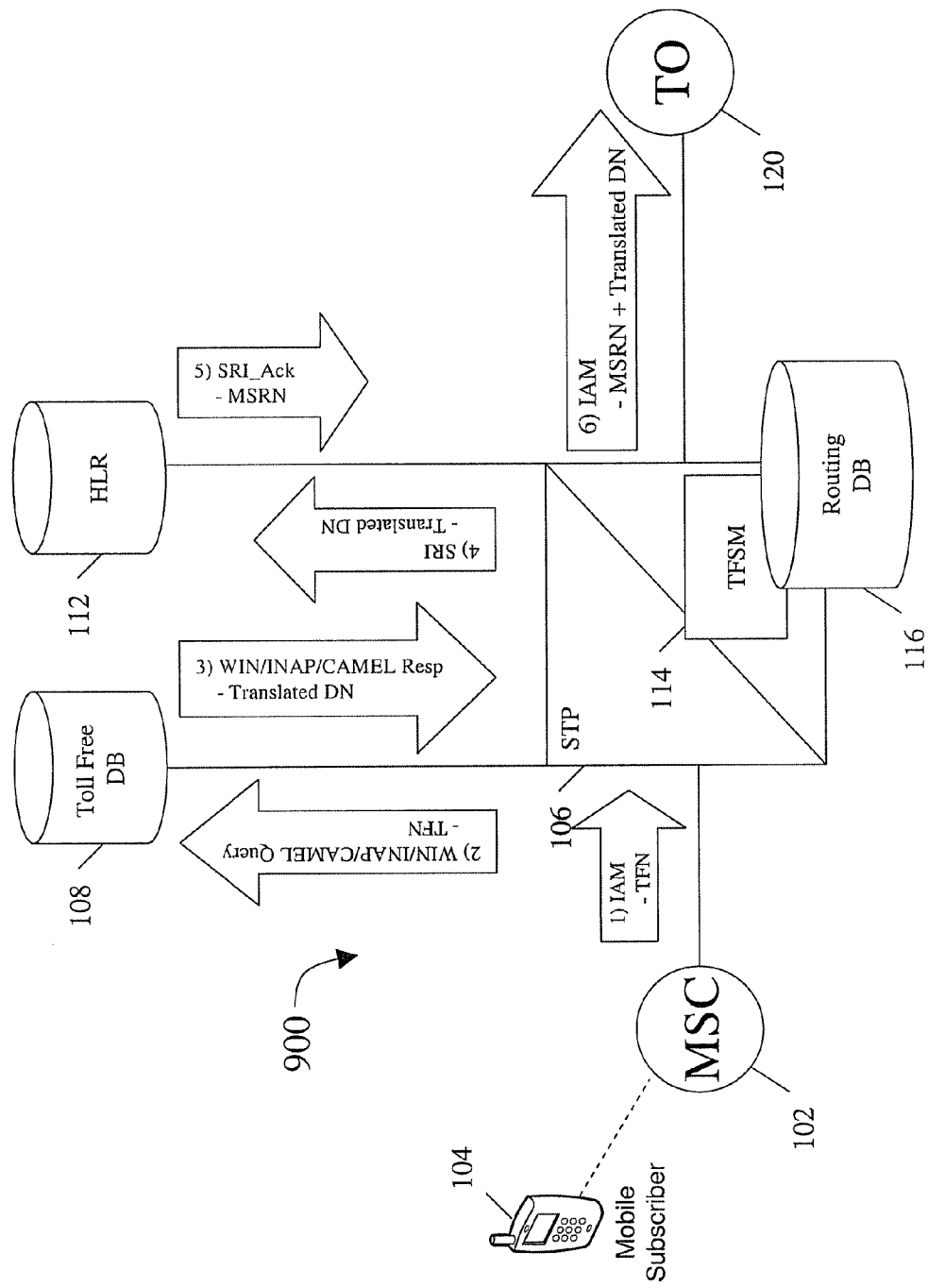
FIG. 9C is a block diagram illustrating an exemplary system for providing triggerless toll-free service in a telecommunications network according to another embodiment of the subject matter described herein, including signaling messages that may be generated in a system that supports mobile subscribers but does not support number portability.

FIG. 9C is a block diagram illustrating an exemplary system for providing triggerless toll-free service in a telecommunications network according to another embodiment of the subject matter described herein. FIG. 9C illustrates exemplary signaling messages that may be generated in a system that implements triggerless toll-free service and supports mobile subscribers but does not support number portability. FIG. 9C, messages 1-3 may be substantially the same as for the embodiment illustrated in FIG. 9A. However, in the embodiment illustrated in FIG. 9C, upon receipt of the translated DN from TFDB 108, TFSM 114 may determine that the translated DN is a mobile number. If so, TFSM 114 determines routing information for the mobile called party subscriber. In one embodiment, TFSM 114 may issue an SRI query including the translated DN (FIG. 9C, message 4) to HLR 112, which responds with an SRI_ACK message including the MSRN for the mobile called party subscriber (FIG. 9C, message 5). TFSM 114 may then issue a call setup message including the MSRN and translated DN (FIG. 9C, message 6), to S2 118. If, in this example, the translated DN provided by TFDB 108 was associated with a wireline called party, TFSM 114 may query routing database 116 to determine routing information.

Figure 9D:
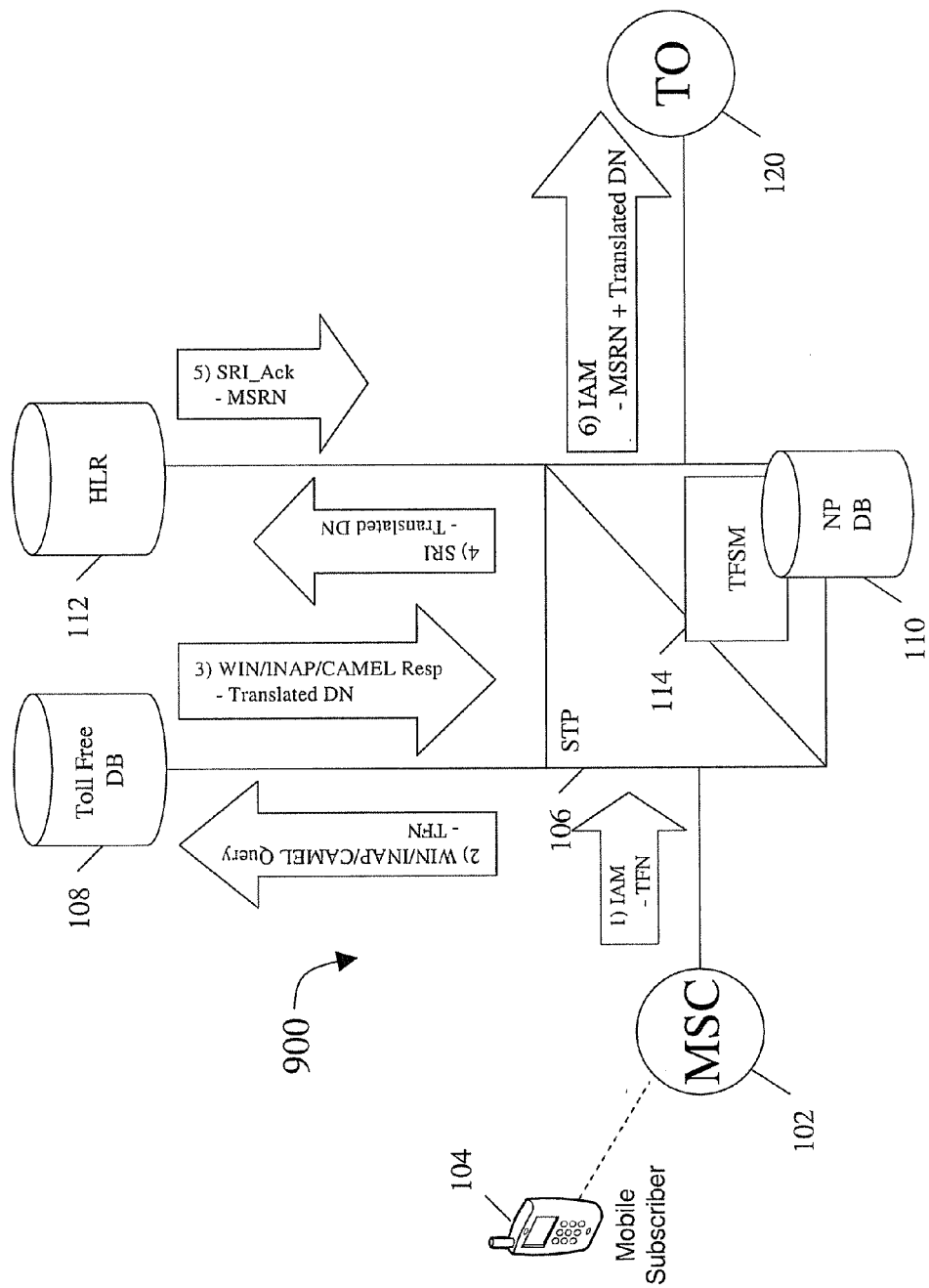
FIG. 9D is a block diagram illustrating an exemplary system for providing triggerless toll-free service in a telecommunications network according to another embodiment of the subject matter described herein, including exemplary signaling messages that may be generated in a system that supports mobile subscribers and also supports number portability.

FIG. 9D is a block diagram illustrating an exemplary system for providing triggerless toll-free service in a telecommunications network according to another embodiment of the subject matter described herein. FIG. 9D illustrates exemplary signaling messages that may be generated in a system that implements triggerless toll-free service, supports mobile subscribers, and supports number portability. FIG. 9D, messages 1-3 may be substantially the same as for the embodiment illustrated in FIG. 9A. However, in the embodiment illustrated in FIG. 9C, upon receipt of the translated DN from TFDB 108, TFSM 114 may determine that a number portability lookup is required. If so, TFSM 114 may query NPDB 110 using the translated DN, which may return routing information, such as a local routing number, associate with the translated DN. TFSM 114 may then determine that the translated DN is a mobile number. If so, TFSM 114 determines routing information for the mobile called party subscriber. In one embodiment, TFSM 114 may issue an SRI query including the translated DN (FIG. 9D, message 4) to HLR 112, which responds with an SRI_ACK message including the MSRN for the mobile called party subscriber (FIG. 9D, message 5). TFSM 114 may then issue a second call setup message including the MSRN and translated DN (FIG. 9C, message 6), to S2 118.

In one embodiment, the routing information RN provided as a result of the NP query may be used by TFSM 114 to determine identify an appropriate HLR to which to send the SRI query. For example, RN may be a network identifier, which TFSM 114 can use to determine which network's HLR to use (i.e., to which HLR the SRI query should be sent). In this embodiment, the routing information provided by the NP query is used to get the routing information from the HLR.

In an alternative embodiment, if TFSM 114 determines that the translated DN is not a mobile number, TFSM 114 may route the second call setup message based on the routing information provided by the NP query. In this embodiment, the routing information provided by the NP query may be discarded and/or replaced by any routing information provided by HLR 112.

The call signaling flows illustrated in FIGS. 9A-9D may also be implemented in a system that supports release, but, due to particular circumstances, does not issue a release message. For example, EO 102 will usually reserve a bearer channel or bearer circuit for connecting the bearer portion of the call between EO 102 and the anticipated next node in the call path. In the embodiment illustrated in FIG. 9A, for example, if EO 102 reserved a bearer path between itself and S2 118, and if, after performing the toll-free and number portability lookups, TFSM 114 determines that S2 118 is the correct destination, there is no need to issue a release. In this case, TFSM 114 would issue message 6 as shown in FIG. 9A.

Figure 10A:
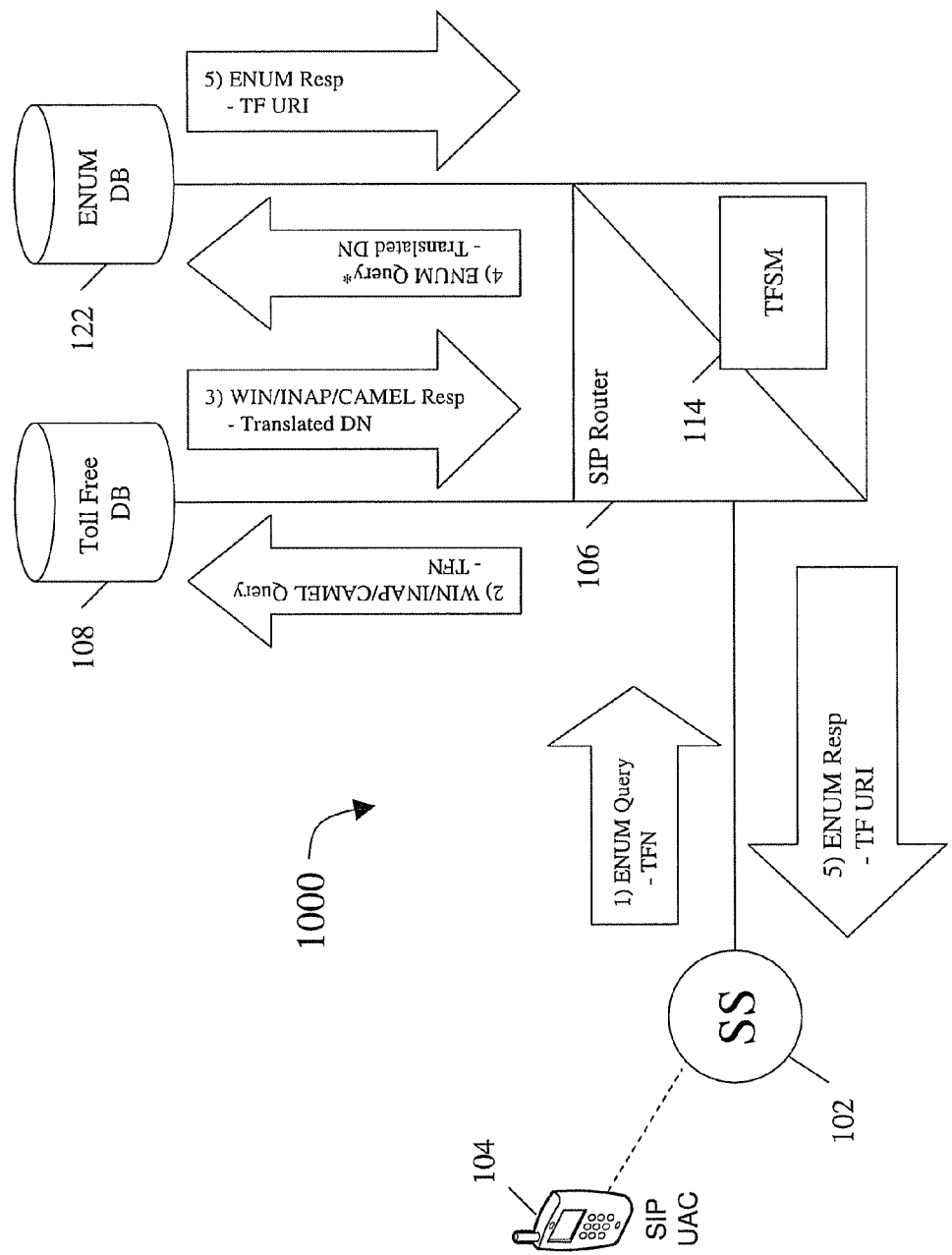
FIG. 10A is a block diagram illustrating an exemplary system for providing triggerless toll-free service with release in a telecommunications network according to another embodiment of the subject matter described herein, using ENUM queries to provide triggered toll-free service.
Figure 10B:
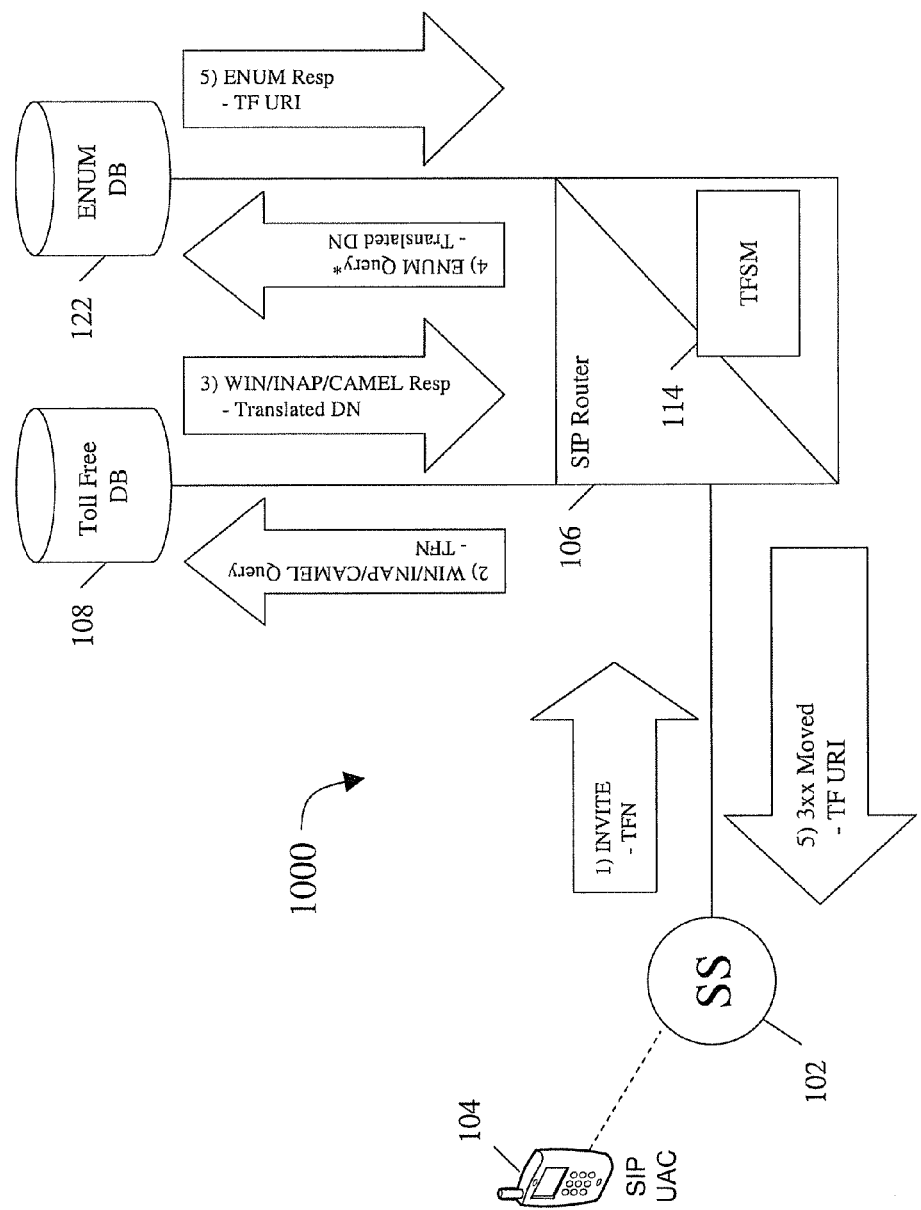
FIG. 10B is a block diagram illustrating an exemplary system for providing triggerless toll-free service with redirect in a telecommunications network using SIP protocol according to another embodiment of the subject matter described herein.
Figure 10C:
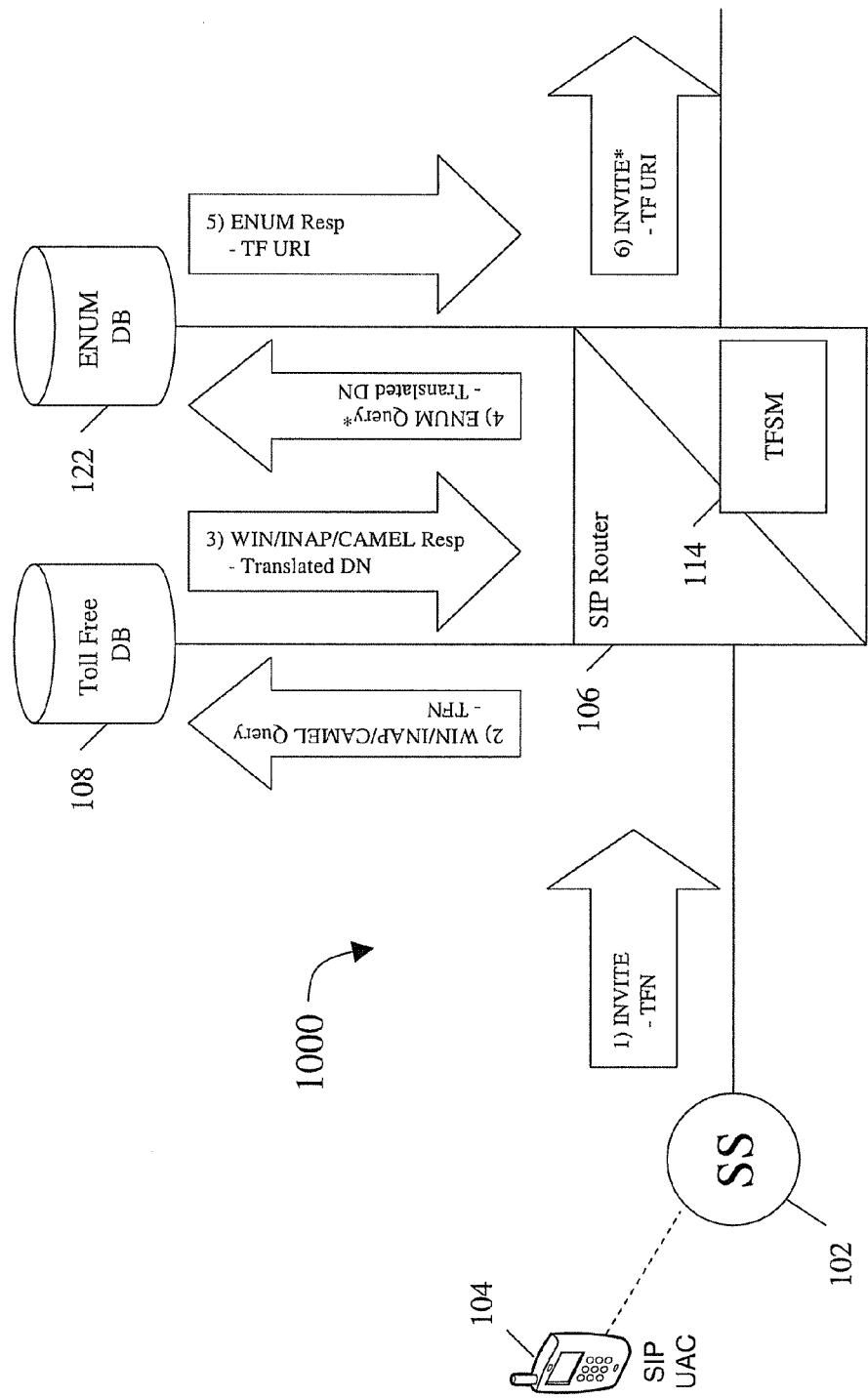
FIG. 10C is a block diagram illustrating an exemplary system for providing triggerless toll-free service without release in a telecommunications network using SIP protocol according to another embodiment of the subject matter described herein.

FIGS. 10A-10C each include a block diagram illustrating an exemplary system for providing toll-free service according to another embodiment of the subject matter described herein. FIGS. 10A-10C illustrate implementation of toll-free service in a SIP network. In each of FIGS. 10A-10C, telecommunications network 1000 includes: a switch S1 102 in a SIP network, such as a softswitch (SS). Alternative switches include, but are not limited to, media gateway controllers (MGCs), media gateways (MGWs), and call session control functions (CSCFs). S1 102 serves SIP user agent client (UAC) 104. Network 1000 also includes: a signaling node 106, such as a SIP router, which includes TFSM 114; a toll-free database TFDB 108 for mapping a toll-free number associated with called party 120 (not shown) to a directory number; and a routing database, such as an E.164 number mapping (ENUM) database (ENUM DB) 122 for mapping a directory number to a URI or other address within the SIP network. Unless otherwise noted, the functions of elements 102, 104, 106, 108, and 114 are substantially identical to the like-numbered elements in FIG. 2, and therefore their descriptions will not be repeated herein.

FIG. 10A is a block diagram illustrating an exemplary system for providing triggerless toll-free service in a telecommunications network according to another embodiment of the subject matter described herein. FIG. 10A illustrates an embodiment of network 1000 which uses ENUM queries to provide triggered toll-free service. In one embodiment, S1 102 is configured to issue an ENUM query in response to detection of a call signaling message that contains a toll-free called party. In the embodiment illustrated in FIG. 10A, a calling party, such as SIP network subscriber 104, initiates a call to a toll-free calling party, for example, by issuing a call setup message, such as a SIP INVITE message. S1 102 receives the call setup message from calling party 104. The call setup message includes information indicating that the called party is a toll-free called party. For example, a SIP message may include a toll-free number, such as a 1-800 number, in the form of a URI associated with a toll-free service, such as "tel:+1-800-555-0000", "sip:+18005550000", etc.

S1 102 may then issue an ENUM query (FIG. 10A, message 1) including the toll-free called party number (TFN). In one embodiment, S1 102 may issue the ENUM query in response to determining that the called party setup message contains a toll-free called party. In an alternative embodiment, S1 102 may always issue an ENUM query, and thus avoids the block of determining whether the called party number is a toll-free number.

In the embodiment illustrated in FIG. 10A, signaling node 106 is configured to analyze incoming ENUM queries in order to detect ENUM queries that contain toll-free called party numbers. Thus, when signaling node 106 receives the ENUM query from S' 102, SIP router and/or TFSM 114 determines that the ENUM query contains a toll-free called party number, and in response, may issue a TF query to TFDB 108 (FIG. 10A, message 2). TFDB 108 may respond with a translated DN (FIG. 10A, message 3).

FIG. 10B is a block diagram illustrating an exemplary system for providing triggerless toll-free service in a telecommunications network according to another embodiment of the subject matter described herein. FIG. 10B illustrates an implementation of triggerless toll-free service with release.

In one embodiment, signaling node 106 is configured to intercept call setup messages that include a toll-free called party and pass them to TFSM 114 for processing. In the embodiment illustrated in FIG. 10B, signaling node 106 intercepts a SIP INVITE message containing a toll-free called party number, TFN (FIG. 10B, message 1). Signaling node 106 queries TFDB 108 using the toll-free called party number (FIG. 10B, message 2). TFDB 108 may return a translated directory number to signaling node 106 (FIG. 10B, message 3).

In one embodiment, signaling node 106 determines routing information for the translated DN by issuing an ENUM query (FIG. 10B, message 4) to ENUM database 122. ENUM database 122 returns an ENUM response (FIG. 10B, message 5) that includes routing information for the translated DN. For example, ENUM database 122 may return a toll-free URI, a SIP address, etc.

In some circumstances, signaling node 106 may issue a redirect message, such as a SIP 3XX message (FIG. 10B, message 5), to indicate that the called party has moved; this message may contain information to indicate to S1 102 the new location of the called party. In the embodiment illustrated in FIG. 10B, the SIP 3XX message includes the routing information provided by the ENUM query, e.g., the toll-free URI.

In the embodiment illustrated in FIG. 10B, both TFDB 108 and ENUM database 122 are remote to signaling node 106, but in alternative embodiments, one or both of the databases may be local to signaling node 106, e.g., contained within signaling node 106.

FIG. 10O is a block diagram illustrating an exemplary system for providing triggerless toll-free service in a telecommunications network according to another embodiment of the subject matter described herein. FIG. 10C illustrates an implementation of triggerless toll-free service without release. FIG. 10C illustrates an embodiment of network 1000 which is substantially identical to the embodiment illustrated in FIG. 10B, except that in FIG. 10C, a release message is not issued, either because network 1000 does not support release or because a release was not needed. The content and purpose of messages 1 through 5 in FIG. 10B are identical to the like-numbered messages in FIG. 10C, and their description will not be repeated herein. However, upon receipt of the toll-free URI from ENUM database 122, signaling node 106 may issue a second call setup message, such as another SIP INVITE (FIG. 10C, message 6), which includes the routing information returned by the ENUM query.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing toll-free service in a telecommunications network, the method comprising:
 at a signaling node that includes at least one processor:
  receiving a first signaling message that includes a toll-free called party number, wherein the first signaling message is one of a non-TCAP call setup message, a mobility management query, a number portability (NP) query, and an E.164 number (ENUM) query;
  determining a directory number associated with the toll-free called party number; and
  sending the first signaling message or a second signaling message, the sent message including at least one of the directory number and routing information associated with the directory number.

2. The method of claim 1 wherein receiving the first signaling message comprises receiving the first signaling message from one of an end office (EO), a service switching point (SSP), a tandem office (TO), a mobile switching center (MSC), a call session control function (CSCF), and a softswitch (SS).

3. The method of claim 1 wherein receiving the first signaling message includes receiving the non-TCAP call setup message comprising one of an integrated services digital network user part (ISUP) initial address message (IAM), an ISUP subsequent address message (SAM), a bearer-independent call control (BICC) message, and a session initiation protocol (SIP) invite message.

4. The method of claim 1 wherein receiving the first signaling message includes receiving the mobility management query comprising one of a mobile application part (MAP) send routing information (SRI) message, a MAP send routing information for short message (SRI_SM) message, an anytime interrogation (ATI) message, and an ANSI-41 location request (LOCREQ) message.

5. The method of claim 1 wherein determining the directory number associated with the toll-free called party number includes querying a toll-free database (TFDB) using the toll-free called party number and receiving a response from the toll-free database, the response including the directory number associated with the toll-free called party number.

6. The method of claim 1 wherein the sent signaling message includes the routing information associated with the toll-free called party number and wherein the routing information comprises at least one of a routing number (RN), a local routing number (LRN), a mobile station roaming number (MSRN), a signaling system 7 (SS7) network address, a point code and subsystem number (PC/SSN), a visited mobile switching center (MSC) identifier, a network node identifier, a switch identifier, a switch address, a message service center address, a voice mail server identifier, an interactive voice response (IVR) server identifier, a network identifier, a universal resource identifier (URI), a session initiation protocol (SIP) address, an IP address, and a domain name.

7. The method of claim 1 wherein the sent signaling message includes the routing information associated with the toll-free called party number and wherein the method further comprises querying a number portability (NP) database using the directory number and receiving a response from the NP database, the response including the routing information.

8. The method of claim 5 wherein the sent signaling message includes the routing information associated with the toll-free called party number and wherein the method further comprises querying a home location register (HLR) using the directory number and receiving a response from the HLR, the response including the routing information.

9. The method of claim 5 wherein the sent signaling message includes the routing information associated with the toll-free called party number and wherein the method further comprises querying a E.164 number (ENUM) database using the directory number and receiving a response from the ENUM database, the response including the routing information.

10. The method of claim 1 wherein sending the first signaling message or a second signaling message includes sending the second signaling message and wherein sending the second signaling message includes sending the second signaling message to a sender of the first signaling message.

11. The method of claim 10 wherein the second signaling message comprises a release message for releasing the current bearer path.

12. The method of claim 11 wherein the release message includes information for selecting a new bearer path.

13. The method of claim 11 wherein the release message comprises an integrated services digital network user part (ISUP) RELEASE message.

14. The method of claim 10 wherein the second signaling message comprises a redirect message for redirecting a call based on the at least one of the directory number and the routing information.

15. The method of claim 14 wherein the redirect message comprises a session initiation protocol (SIP) REDIRECT message.

16. The method of claim 1 wherein sending the first signaling message or a second signaling message includes sending the second signaling message and wherein sending the second signaling message includes sending the second signaling message to a second switch.

17. The method of claim 1 wherein the signaling node comprises a signaling message routing node.

18. A signaling node for providing toll-free service in a telecommunications network, the node comprising:
   a communications interface for receiving a first signaling message that includes a toll-free called party number, wherein the first signaling message is one of a non-TCAP call setup message, a mobility management query, a number portability (NP) query, and an E.164 number (ENUM) query;
   a toll-free service module (TFSM) for determining a directory number associated with the toll-free called party number and for sending the first signaling message or a second signaling message, the sent message including at least one of the directory number and routing information associated with the directory number.

19. The signaling node of claim 18 wherein the TFSM is configured to determine the directory number associated with the toll-free called party number by querying a toll-free database (TFDB) for associating toll-free called party numbers to directory numbers.

20. The signaling node of claim 18 wherein the TFSM is configured to determine the routing information associated with the directory number by querying at least one of an NP database, a home location register (HLR), an ENUM database, and a routing database.

21. The signaling node of claim 20 wherein the TFSM is configured to query at least one of the NP database, the HLR, the ENUM database, and the routing database using one of a transaction capabilities application part (TCAP) protocol, a mobility application part (MAP) protocol, an Internet protocol (IP), a signaling connection and control part (SCCP) user adaptation (SUA) protocol, and a session initiation protocol (SIP).

22. The signaling node of claim 18 wherein the routing information associated with the directory number comprises at least one of: a routing number (RN), a local routing number (LRN), a mobile station roaming number (MSRN), a signaling system 7 (SS7) network address, a point code and subsystem number (PC/SSN), a visited mobile switching center (MSC) identifier, a network node identifier, a switch identifier, a switch address, a message service center address, a voice mail server identifier, an interactive voice response (IVR) server identifier, a network identifier, a universal resource identifier (URI), a session initiation protocol (SIP) address, an IP address, and a domain name.

23. A system for providing toll-free service in a telecommunications network, the system comprising:
   a signaling message routing node for receiving, from a first network entity, a first signaling message that includes a toll-free called party number, wherein the first signaling message is one of a non-TCAP call setup message, a mobility management query, a number portability (NP) query, and an E.164 number (ENUM) query; and
   a toll-free service module (TFSM) operatively associated with the signaling node for determining a directory number associated with the toll-free called party number and for sending the first signaling message or a second signaling message, the sent message including at least one of the directory number and routing information associated with the directory number.

24. The system of claim 23 wherein the first network entity is one of an end office (EO), a service switching point (SSP), a tandem office (TO), a mobile switching center (MSC), a call session control function (CSCF), and a softswitch (SS).

25. The system of claim 24 wherein the first network entity is configured to send, in response to a determination that a call in the network is to a toll-free called party number, one of a mobility management message, a number portability query, and an E.164 number translation query.

26. A non-transitory computer readable medium having stored thereon computer-executable instructions that when executed by the processor of a computer control the computer to perform steps comprising:
   receiving a first signaling message that includes a toll-free called party number, wherein the first signaling message is one of a non-TCAP call setup message, a mobility management query, a number portability (NP) query, and an E.164 number (ENUM) query;
   determining a directory number associated with the toll-free called party number; and
   sending the first signaling message or a second signaling message, the sent message including at least one of the directory number and routing information associated with the directory number.

* * * * *